(12) United States Patent
Kishimoto et al.

(10) Patent No.: US 6,928,369 B2
(45) Date of Patent: Aug. 9, 2005

(54) ULTRASONIC CURRENT METER

(75) Inventors: Masao Kishimoto, Tokyo (JP); Ryohei Motegi, Tokyo (JP); Yukihiko Suzuki, Tokyo (JP); Hiroshi Iwabuchi, Tokyo (JP)

(73) Assignee: Tokimec, Inc., Tokyo (JP)

( * ) Notice: Subject to any disclaimer, the term of this patent is extended or adjusted under 35 U.S.C. 154(b) by 0 days.

(21) Appl. No.: 10/477,711

(22) PCT Filed: May 15, 2002

(86) PCT No.: PCT/JP02/04706
§ 371 (c)(1),
(2), (4) Date: Nov. 14, 2003

(87) PCT Pub. No.: WO02/103299
PCT Pub. Date: Dec. 27, 2002

(65) Prior Publication Data
US 2004/0107779 A1 Jun. 10, 2004

(30) Foreign Application Priority Data

May 16, 2001 (JP) ........................ 2001-147006

(51) Int. Cl.$^7$ ........................ G01F 1/00; G01F 17/00; G01F 1/66
(52) U.S. Cl. ........................ 702/45; 702/50; 702/54; 73/861.29
(58) Field of Search ........................ 702/45, 46, 49, 702/50, 54; 73/861.18, 861.27, 861.28, 861.29, 861.31

(56) References Cited

U.S. PATENT DOCUMENTS 5,553,505 A * 9/1996 Bignell et al. ........... 73/861.28

FOREIGN PATENT DOCUMENTS

| JP | 51-82658 | 7/1976 |
|---|---|---|
| JP | 53-79573 | 7/1978 |
| JP | 55-70760 | 5/1980 |
| JP | 3-180767 | 8/1991 |
| JP | 6-180324 | 6/1994 |
| JP | 7-500662 | 1/1995 |
| JP | 10-221140 | 8/1998 |
| JP | 11-514443 | 12/1999 |

* cited by examiner

Primary Examiner—John Barlow
Assistant Examiner—Meagan S Walling
(74) Attorney, Agent, or Firm—McGinn & Gibb PLLC

(57) ABSTRACT

The present invention provides a small, low power consumption ultrasonic flow velocity meter. The burst signal generation section 110 generates two kinds of burst signals with a phase difference and sends these burst signals to a pair of transmission/reception ultrasonic transducers 6 and 7 located on the upstream side and downstream side of the conduit to be measured 9. Upon reception of the corresponding burst signals, the pair of the transmission/reception ultrasonic transducers 6 and 7 convert the burst signals, send ultrasonic waves with a phase difference to the conduit to be measured 9, receive the ultrasonic wave sent by the other transmission/reception ultrasonic transducer and propagated through the conduit to be measured and convert the ultrasonic waves to received signals. These received signals are binarized through the binarization circuits 16 and 17, exclusive-ORed by the exclusive-OR circuit 30 and converted to a phase difference signal indicating a phase difference and the flow velocity of the conduit to be measured 9 is measured based on this phase difference signal.

22 Claims, 21 Drawing Sheets

ULTRASONIC CURRENT METER

TECHNICAL FIELD

The present invention relates to an ultrasonic flow velocity meter which measures a flow velocity of a fluid based on a time difference in propagation of an ultrasonic wave.

BACKGROUND ART

As an example of a conventional ultrasonic flowmeter using an ultrasonic flow velocity meter of this type, an ultrasonic flowmeter based on a propagation time difference is known. In such a current meter, an ultrasonic transducer is placed on the upstream side and downstream side of a conduit to be measured respectively and uses an impulse signal or step signal as a transmission signal, sends out ultrasonic waves from two ultrasonic transducers on the upstream side and downstream side alternately and measures the time difference in propagation of the received signal using a high-speed counter circuit.

However, such an ultrasonic flowmeter based on a propagation time difference is required to have a high signal-to-noise ratio to accurately determine the propagation time difference, and in the case of an impulse signal in particular, the reception time in an initial area of a waveform with small output needs to be measured precisely, which requires a high-voltage impulse signal or step signal. This requires a power supply circuit to generate a high voltage in the apparatus, which constitutes a great obstacle in downsizing of the apparatus and reduction of power consumption.

Furthermore, application of a high-voltage signal to the ultrasonic transducer limits its use in a place full of explosive gas.

Furthermore, an accurate measurement of an ultrasonic propagation time requires the use of a counter with a high count frequency, which increases power consumption and also constitutes a great obstacle against low power consumption in this sense.

Another known type is that a transmission ultrasonic transducer and a reception ultrasonic transducer are provided on the upstream side, another transmission ultrasonic transducer and another reception ultrasonic transducer are provided on the downstream side, continuous waves are sent from the transmission ultrasonic transducers on the upstream and downstream sides, which are received by the reception ultrasonic transducers on the downstream and upstream sides, phase differences between the received signals are measured and a flow velocity is calculated from those phase differences (e.g., Japanese Patent Laid-Open No. 7-167696). However, when used for such continuous waves, transmission ultrasonic transducers and reception ultrasonic transducers, at least two each, four in total are required, resulting in problems that the cost increases as the number of parts increases and the size of the apparatus increases and that consecutive transmissions and receptions will also increase power consumption.

The present invention has been implemented in view of such problems and it is an object of the present invention to provide a small, low cost and low power consumption ultrasonic flow velocity meter.

DISCLOSURE OF THE INVENTION

In order to attain the above described object, the low power ultrasonic flow velocity meter according to the present invention comprises burst signal generating means for generating two kinds of burst signals with a phase difference, a pair of transmission/reception ultrasonic transducers located on the upstream side and downstream side of the conduit to be measured, which receive their corresponding burst signals from said burst signal generating means, covert said burst signals, send ultrasonic waves with a phase difference into the conduit to be measured, receive ultrasonic waves sent by the other transmission/reception ultrasonic trasducer and propagated through the conduit to be measured and convert the ultrasonic waves to recieved signals, binarizing means for binarizing the receive signals from said respective transmission/reception ultrasonic trasducers, phase difference measuring means for measuring a phase difference between binarized received signals from their respective received signals binarized by the binarizing means by means of a logical circuit, and flow velocity measuring means for measuring the flow velocity of the conduit to measurred based on the phase difference signal between the received signals from said phase difference measuring means.

Since the present invention obtains the flow velocity from a phase difference, it needs only a low voltage burst signal compared to the conventional propagation time difference type, requires no power supply circuit to generate a high voltage, requires no counter circuit which needs to operate at high speed, and can thereby reduce the size and power consumption of the apparatus and improve its explosion proof characteristic. Furthermore, since the present invention uses a burst signal, it is possible to allow the pair of transmission/reception ultrasonic transducers to perform transmission and reception simultaneously, reduce the number of parts and realize a small and low-cost configuration. Furthermore, the use of a burst signal allows processing for a phase difference measurement and flow velocity measurement after transmission and reception to be carried out intermittently, making it possible to realize the apparatus with low power consumption unlike the conventional one which processes continuous waves all the time. It will be easily understood that the present invention is not limited to the use of only a pair of transmission/reception ultrasonic transducers and the present invention can be adapted to have a plurality of pairs of transmission/reception ultrasonic transducers to reduce influences of measurement errors due to deviation of a flow velocity distribution and improve the accuracy. In this case, this adaptation is made by carrying out measurements by switching between the pairs of transmission/reception ultrasonic transducers or providing a plurality of lines of some measurement circuits.

The phase difference measuring means can provide a phase difference signal indicating a phase difference between two received signals to pass through a low pass filter and measures the DC level thereof. By causing the phase difference signal indicating a phase difference between two received signals to pass through the low pass filter and converting it to a low frequency signal (DC voltage), it is possible to reduce the required processing speed and allow the apparatus to carry out processing stably with low power consumption. Furthermore, converting the signal to a low frequency signal is equivalent to carrying out averaging processing, and therefore allows measurement with a high degree of accuracy.

The phase difference measuring means can measure a phase difference between only the most sensitive central portions of waveforms of the respective received signals. Since the central portions with the highest sensitivity of the waveforms of the received signals are used, it is possible to save output of transmission signals and further reduce power consumption. It is also possible to eliminate influences of instability of phase information which occurs near both ends of the waveform of the received signal.

The phase difference measuring means can include a sample-and-hold circuit to output a phase difference only for a determined period.

Optionally, it is also possible to provide offset voltage adjusting means for maintaining the duty ratio of the signals binarized by the binarizing means at 50%. Optionally, it is further possible to provide the phase difference measuring means with an exclusive OR circuit. It is of course possible to use any circuit other than the exclusive OR circuit, but the exclusive OR circuit has high sensitivity and is therefore preferable.

The low power type ultrasonic flow velocity meter can further comprise frequency dividing means for dividing the frequencies of the received signals binarized by the binarizing means between the binarizing means and the phase difference measuring means, wherein the phase difference measuring means measures the phase difference between these received signals whose frequencies have been divided by the frequency dividing means. A frequency divider circuit can widen the measurement current flow range. By selecting an appropriate frequency dividing ratio, it is possible to widen the measurement range arbitrarily. Optionally, to stabilize the start of frequency division, it is recommendable to perform envelope detection of a received signal and start frequency division after a lapse of a predetermined delay time including 0 after the envelope detection signal exceeds predetermined intensity.

The low power ultrasonic flow velocity meter can further comprise ultrasonic propagation time measunng means for measuring an ultrasonic propagation time after generation of a burst signal by the burst signal generating means until reception of the transmission/reception ultrasonic transducers, wherein the flow velocity measuring means measures the flow velocity of the conduit to be measured based on the ultrasonic propagation time as well as the phase difference signal between the received signal from the phase difference measuring means. By calculating the flow velocity using the ultrasonic propagation time even when the flow velocity changes due to a temperature variation, it is possible to make an accurate measurement without being affected by temperature variations. It is also possible to measure the temperature of the fluid.

The ultrasonic propagation time measuring means can provide an ultrasonic propagation time signal indicating the ultrasonic propagation time to pass through a low pass filter to measure the DC level. By causing an ultrasonic propagation time signal indicating its ultrasonic propagation time to pass through the low pass filter and converting it to a low frequency signal (DC voltage), it is possible to reduce the required processing speed and allow the apparatus to carry out processing stably with low power consumption. Furthermore, converting the signal to a low frequency signal is equivalent to subjecting it to averaging processing allowing accurate measurement.

The phase difference measuring means can measures during a corrective measurement a phase difference between two kinds of burst signals having the phase difference from the burst signal generating means and the flow velocity measuring means can correct flow velocity measurements using the measured phase difference between the burst signals. During a corrective measurement, the phase difference measuring means measures the phase difference between two kinds of burst signals and measures its phase difference as in the case of a normal measurement, and can thereby eliminate influences of any drift component which may occur in the two kinds of burst signals generated by the burst signal generating means or any drift component due to unbalance in other parts which should not originally be generated.

The low power ultrasonic flow velocity meter can further comprise a switching circuit that switches between two kinds of burst signals with a phase difference from the burst signal generating means during a corrective measurement and during a normal measurement to supply the corresponding burst signal of the two kinds of the burst signals to the transmission/reception ultrasonic transducers. The switching circuit switches between the two kinds of the burst signals to be input to the transmission/reception ultrasonic transducers during a corrective measurement and during a normal measurement, and can thereby eliminate influences of any drift component which may occur in the two kinds of burst signals generated by the burst signal generating means or any drift component due to unbalance in other parts which should not essentially be generated.

The low power ultrasonic flow velocity meter can further comprise an amplification circuit that amplifies a received signal between the pair of transmission/reception ultrasonic transducers and the flow velocity measuring means, wherein the amplification circuit performs an amplification operation only at predetermined timing including reception timing of the received signal. Since the amplification circuit consumes power for only a time period during which a supply voltage is generated, it is possible to reduce power consumption considerably when compared to a case where power is supplied all the time. Furthermore, with small power consumption, it is possible to prevent temperature from increasing and considerably improve the reliability of the amplification circuit compared to a case where power is supplied all the time. Thus, it is also possible to reduce influences of temperature drift of the circuit.

The low power ultrasonic flow velocity meter can be connected to a power supply through a two-wire loop and further can comprise a two-wire interface section for transmitting measured values obtained by the flow velocity measuring means using the two-wire loop. The two-wire loop alone can supply a supply voltage and send the measurement result. The ultrasonic flow velocity meter of the present invention is designed to reduce power consumption, and can thereby be operated with even a low supply voltage from such a two-wire loop satisfactorily.

It is also possible to use the ultrasonic flow velocity meter of the present invention to constitute an ultrasonic flowmeter to calculate a flow rate of a conduit to be measured.

BEST MODE FOR CARRYING OUT THE INVENTION

Figure 1:
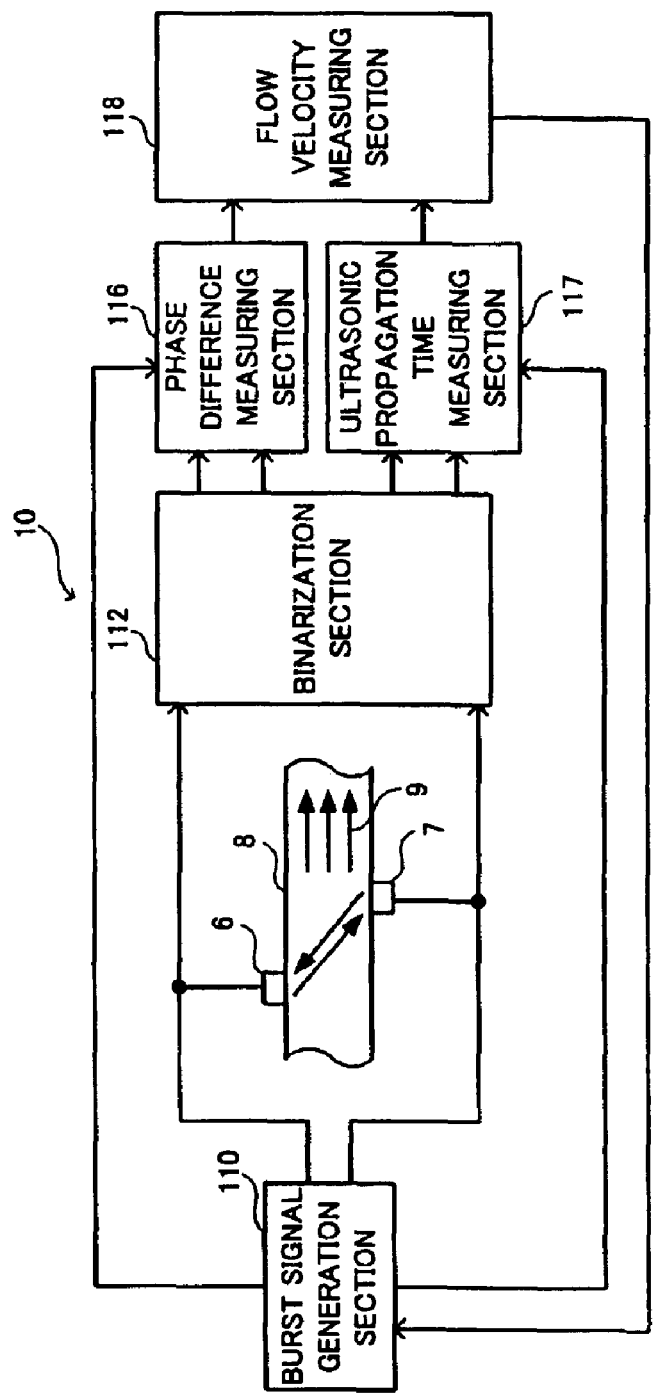
FIG. 1 is an overall block diagram of an ultrasonic flow velocity meter according to the present invention.

With reference now to the attached drawings, embodiments of the present invention will be explained below. FIG. 1 is a block diagram of an ultrasonic flow velocity meter according to the present invention.

In the figure, an ultrasonic flow velocity meter 10 generally includes a burst signal generation section 110 which generates two kinds of burst signals having a phase difference, a pair of transmission/reception ultrasonic transducers 6 and 7, a binarization section 112 which binarizes the received signals from the transmission/reception ultrasonic transducers 6 and 7, a phase difference measuring section 116 which calculates a phase difference between the respective binarized received signals, an ultrasonic propagation time measuring section 117 and a flow velocity measuring section 118 which measures the flow velocity and flow rate of a conduit to be measured based on a phase difference signal from the phase difference measuring section 116. The pair of transmission/reception ultrasonic transducers 6 and 7 are attached to a tube 8 through which the conduit to be measured flows. A fluid 9 to be measured whose flow velocity and flow rate are to be measured flows through the tube 8.

Each section will be explained below using the detailed block diagram in FIG. 2.

The burst signal generation section 110 includes a trigger circuit 1, a transmission signal generation circuit 2 and a timing circuit 3. The trigger circuit 1 generates a transmission trigger signal S22 at set transmission repetition intervals and this signal S22 is sent not only to the transmission signal generation circuit 2 and the timing circuit 3 but also to an ultrasonic propagation time measuring section 117 which will be described later. The timing circuit 3 outputs a transmission leakage mask signal S23 and a sample-and-hold circuit control signal S32 which will be described later based on the transmission trigger signal S22. The transmission signal generation circuit 2 generates a transmission signals A and B which are burst signals with different phases simultaneously based on the transmission trigger signal S22. The transmission signal generation circuit 2 is constructed of a logic IC and is preferably combined with a band pass filter to remove a high frequency component and low frequency component which are generated because the output waveform of the logic IC is rectangle.

Figure 3:
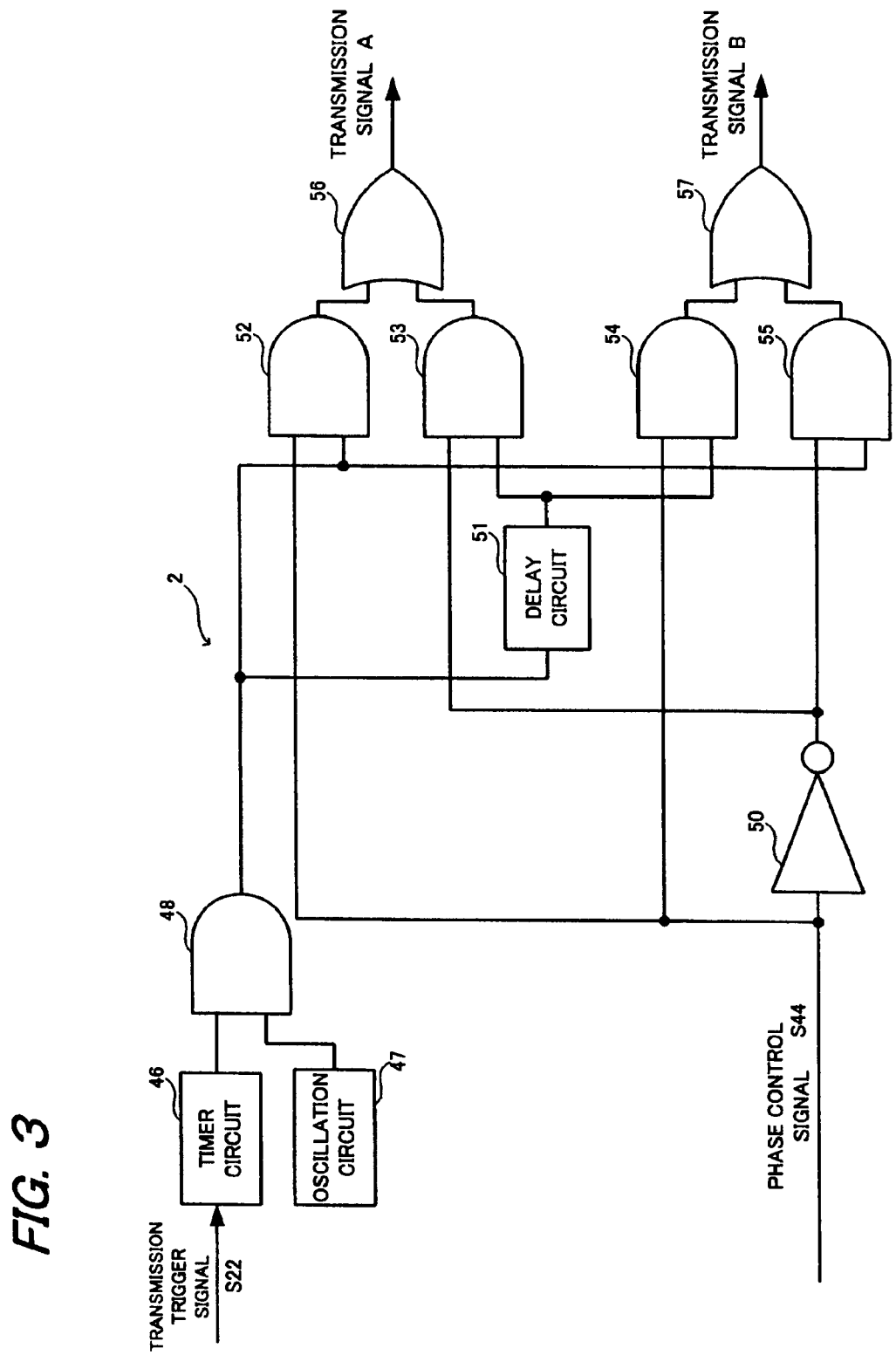
FIG. 3 is a detailed block diagram of the transmission signal generation circuit in FIG. 2.

FIG. 3 is a block diagram showing a detailed configuration of the transmission signal generation circuit 2. The transmission signal generation circuit 2 is constructed of a timer circuit 46, an oscillation circuit 47, an AND circuit 48, a logical inversion circuit 50, a delay circuit 51, AND circuits 52, 53, 54 and 55 and OR circuits 56 and 57.

The transmission trigger signal S22 from the trigger circuit 1 is input to the timer circuit 46. The timer circuit 46 outputs a rectangular pulse corresponding to the transmission pulse width and the oscillation circuit 47 generates a continuous pulse signal which matches the frequency of an ultrasonic transducer. The output of the timer circuit 46 and the output of the oscillation circuit 47 are input to the AND circuit 48, ANDed by the AND circuit 48 and a burst signal is generated. The burst signal output from the AND circuit 48 is supplied to the input of the delay circuit 51, one input of the AND circuit 52 and one input of the AND circuit 55. The delay circuit 51 is designed to delay the output of the AND circuit 48 by a time corresponding to a phase difference of a predetermined angle, for example, 90 degrees. The output from the delay circuit 51 is supplied to one input of the AND circuit 53 and one input of the AND circuit 54. A phase control signal S44 output from a calculation circuit 36 which will be described later is supplied to the input of the logical inversion circuit 50, the other input of the AND circuit 52 and the other input of the AND circuit 54. The output of the logical inversion circuit 50 which inverts the phase control signal S44 is supplied to the other input of the AND circuit 53 and the other input of the AND circuit 55. The outputs of the AND circuit 52 and the AND circuit 53 are input to the two inputs of the OR circuit 56. The outputs of the AND circuit 54 and the AND circuit 55 are input to the two inputs of the OR circuit 57. The output of the OR circuit 56 is a transmission signal A and the output of the OR circuit 57 is a transmission signal B. During a normal measurement, the phase control signal S44 is high and the burst signal output from the AND circuit 48 is directly output from the OR circuit 56 through the AND circuit 52 to become the transmission signal A. On the other hand, the burst signal output from the AND circuit 48 becomes a burst signal with a phase delayed by 90 degrees by the delay circuit 51 and output from the OR circuit 57 through the AND circuit 54 to become the transmission signal B. Furthermore, assuming that the phase control signal S44 is low, the transmission signal A output from the OR circuit 56 has a phase delay of 90 degrees with respect to the transmission signal B output from the OR circuit 57 and the phases of the transmission signals A and B are replaced by the phase control signal S44.

The above described transmission signals A and B are sent to the transmission/reception ultrasonic transducers 6 and 7 respectively. The transmission/reception ultrasonic transducers 6 and 7 convert the transmission signals A and B which are burst signals to ultrasonic waves and send them to the fluid 9 to be measured in the tube 8, at the same time receive the ultrasonic waves which have propagated through the fluid 9 to be measured and convert them to the received signals A and B respectively and output them. These transmission/reception ultrasonic transducers 6 and 7 must be attached to the tube 8 in an appropriate positional relationship so that ultrasonic waves are transmitted/received appropriately. One transmission/reception ultrasonic transducer (ultrasonic transducer 6 in the example of the figure) is placed on the upstream side while the other transmission/reception ultrasonic transducer (ultrasonic transducer 7 in the example of the figure) is placed on the downstream side. The transmission/reception ultrasonic transducers 6 and 7 may be attached outside the tube 8 or may also be attached inside the tube 8.

The received signals A and B from these transmission/reception ultrasonic transducers 6 and 7 are input to the above described binarization section 112. The binarization section 112 includes amplification circuits 14 and 15, binarization circuits 16 and 17, envelope detection circuits 18 and 19 and binarization circuits 24 and 25. The amplification circuits 14 and 15 amplify the received signals A and B and must have an appropriate band width to remove unnecessary noise components. However, depending on the low power consumption which is a feature of the present invention, in other words, high sensitivity, these amplification circuits 14 and 15 may also be omitted. The outputs of the amplification circuits 14 and 15 are input to the binarization circuits 16 and 17. The binarization circuits 16 and 17 binarize the outputs of the amplification circuits 14 and 15 for a period during which the outputs from the binarization circuits 24 and 25 are high and are constructed of a comparison circuit, or like.

Figure 4:
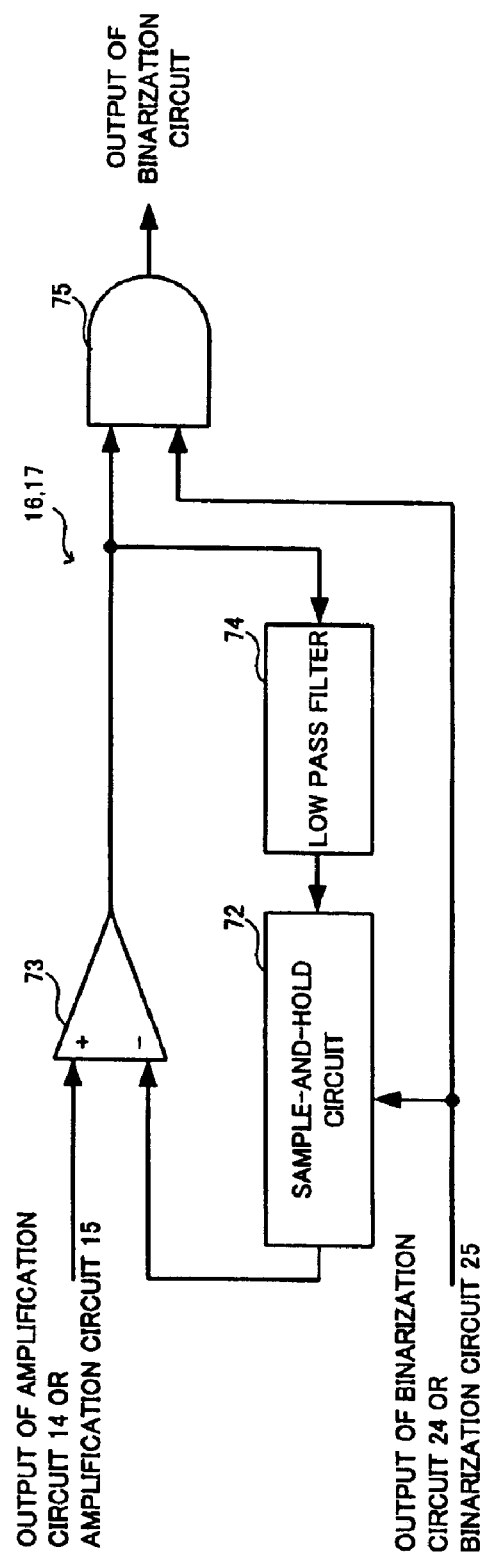
FIG. 4 is a detailed block diagram of the binarization circuits 16 and 17 of FIG. 2.

A configuration example of the binarization circuits 16 and 17 is shown in FIG. 4. The binarization circuits 16 and 17 can be simply constructed in such a way that the outputs of the amplification circuits 14 and 15 are compared by the comparison circuit using a voltage near 0 V as a threshold. However, the example shown in FIG. 4 includes an offset voltage adjusting means to maintain the duty ratio of the binarized signal at 50% all the time in order to increase the accuracy for subsequent detection of phase differences. That is, the binarization circuits 16 and 17 include offset voltage adjusting means comprised of a sample-and-hold circuit 72, a low pass filter 74 and an AND circuit 75 as well as a comparison circuit 73. The outputs from the binarization circuits 24 and 25 are control signals of the sample-and-hold circuit 72 and when the outputs from the binarization circuits 24 and 25 are high, the sample-and-hold circuit 72 sends the output from the low pass filter 74 directly to the minus input terminal of the comparison circuit 73 and when the outputs from the binarization circuits 24 and 25 are low, the sample-and-hold circuit 72 continues to send the output from the low pass filter 74 immediately before it becomes low to the minus input terminal of the comparison circuit 73. The comparison circuit 73 compares the output of the amplification circuit 14 or amplification circuit 15 with the output of the sample-and-hold circuit 72. If the duty ratio of the output of the comparison circuit 73 for a period during which the outputs from the binarization circuits 24 and 25 which are control signals of the sample-and-hold circuit 72 are high exceeds 50%, the output of the low pass filter 74 increases, resulting in an increase in the voltage level of the minus input terminal of the comparison circuit 73 and a decrease in the duty ratio of the comparison circuit 73. On the contrary, if the duty ratio of the output of the comparison circuit 73 for a period during which the outputs from the binarization circuits 24 and 25 which are control signals of the sample-and-hold circuit 72 are high falls below 50%, the output of the low pass filter 74 decreases, resulting in a decrease in the voltage level of the minus input terminal of the comparison circuit 73 and an increase in the duty ratio of the comparison circuit 73. Through the above described operations, it is possible to always maintain the duty ratio of the comparison circuit 73 at 50% for a period during which the control signal of the sample-and-hold circuit 72 is high irrespective of variations in the offset voltage produced inside the comparison circuit 73, etc. In this way, assuming the cycle of a received signal pulse is T, it is possible to accurately set the pulse width of a pulse appearing at the binarization circuits 16 and 17 to T/2. Since the output of the binarization circuit which is the output of the AND circuit 75 is kept low except for the period during which the outputs of the corresponding binarization circuits 24 and 25 are high, the subsequent circuits from the binarization circuits 16 and 17 can keep a stationary state and can consequently reduce power consumed by those circuits. The low pass filter 74 is preferably constructed of an active filter for accurate operation of the circuit. Furthermore, the example in the figure has been explained assuming that the sample-and-hold circuit 72 is independent of the low pass filter 74, but it is also possible to easily consider constructing the low pass filter 74 and the sample-and-hold circuit 72 as one body.

Returning to FIG. 2, the outputs of the above described amplification circuits 14 and 15 are also input to the envelope detection circuits 18 and 19. The envelope detection circuits 18 and 19 are fed a transmission leakage mask signal S23 from the above described timing circuit 3 and the envelope detection circuits 18 and 19 are intended to perform envelope detection of signals other than the signals masked by this transmission leakage mask signal S23. The transmission leakage mask signal S23 is created by the timing circuit 3 based on the transmission trigger signal S22, becomes high for a period during which the transmission signals A and B are output and becomes low for a period during which the received signals A and B appear.

The outputs of the envelope detection circuits 18 and 19 are connected to the inputs of the binarization circuits 24 and 25. The binarization circuits 24 and 25 binarize the signals from the envelope detection circuits 18 and 19 with a predetermined threshold voltage Th1. The threshold voltage Th1 of this binarization must be set to a value equal to or greater than the noise level for an optimal operation of the circuit. The binarization circuits 24 and 25 are connected to the binarization circuits 16 and 17 and the ultrasonic propagation time measuring section 117 respectively.

Then, the received signals binarized by the binarization circuits 16 and 17 are input to the above described phase difference measuring section 116. The phase difference measuring section 116 includes an exclusive OR circuit 30, a sample-and-hold circuit 31, a low pass filter 33 and an A/D conversion circuit 35. The exclusive OR circuit 30 outputs an exclusive OR signal from the received signals of the binarization circuits 16 and 17. This exclusive OR varies according to the phase difference of the above described two received signals and the output thereof is input to the sample-and-hold circuit 31. The sample-and-hold circuit 31 is fed a sample-and-hold circuit control signal S32 from the timing circuit 3 and the sample-and-hold circuit 31 performs sample-and-hold on the exclusive OR signal when this control signal S32 is high and keeps the value when the control signal S32 is low. The output from the sample-and-hold circuit 31 is sent to the low pass filter 33. The low pass filter 33 removes a high frequency component and converts it to a low frequency signal (DC voltage) and the DC voltage level thereof corresponds to the phase difference of the above described received signal. Then, the output thereof is A/D-converted by the A/D conversion circuit 35.

The outputs of the binarization circuits 24 and 25 are also input to the ultra sonic propagation time measuring section 117. The ultrasonic propagation time measuring section 117 includes latch circuits 28 and 29, low pass filters 37 and 38, an addition circuit 39 and an A/D conversion circuit 41. The latch circuits 28 and 29 output signals which are set at the rising edge of the transmission trigger signal S22 and reset at the rising edge from the binarization circuits 24 and 25. The width of this signal corresponds to the ultrasonic propagation time from transmission to reception. The outputs of these latch circuits 28 and 29 are deprived of the high frequency components by the low pass filters 37 and 38 and converted to low frequency signals (DC voltages) and those DC voltage levels correspond to the time difference from the transmission to the reception. The addition circuit 39 adds up the DC voltages from the low pass filters 37 and 38 and its output is A/D-converted by the A/D conversion circuit 41.

The signals A/D-converted by the A/D conversion circuit 35 and A/D conversion circuit 41 are input to the flow velocity measuring section 118. The flow velocity measuring section 118 includes a calculation circuit 36, a display section 42 and an input section 43 such as a keyboard. The calculation circuit 36 can be constructed of a microcomputer having a CPU and memory, etc., intended to calculate the flow velocity and flow rate of the conduit to be measured from the output from the ultrasonic propagation time measuring section 117 and the output from the phase difference measuring section 116. Furthermore, it is possible to automatically select the measurement mode and corrective measurement mode from the input of the input section 43 or at predetermined time intervals and through this selection, the phase control signal S44 is output from the calculation circuit 36 and a setting is made so that the phase control signal S44 becomes high during a measurement and the phase control signal S44 becomes low during a corrective measurement.

The operation of the ultrasonic flow velocity meter configured as shown above will be explained with reference to the signal timing charts in FIGS. 5 to 11.

1. Measurement of Ultrasonic Propagation Time

Figure 5:
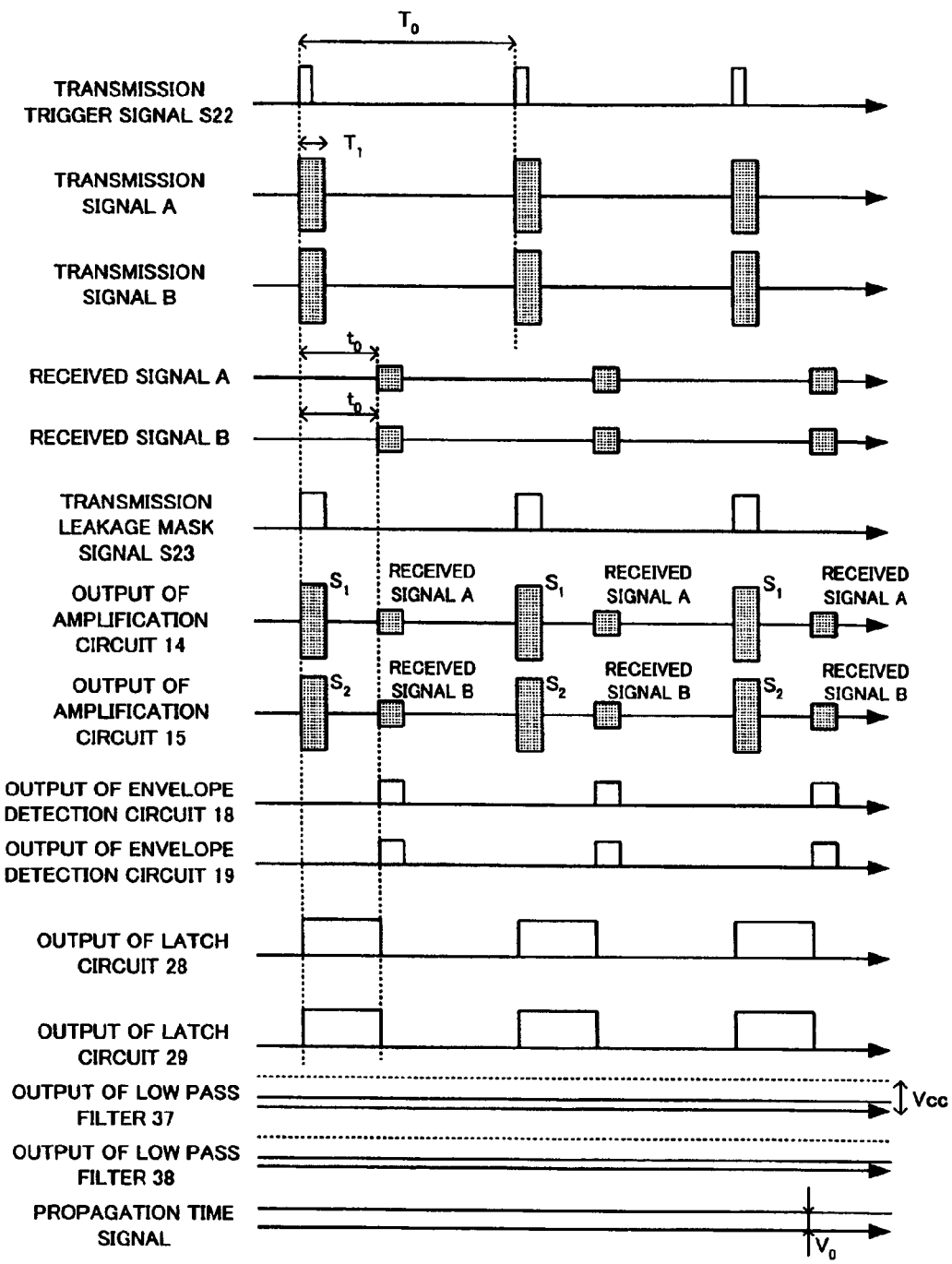
FIG. 5 is a timing chart showing the principle of measurement of an ultrasonic propagation time using the ultrasonic flow velocity meter of the present invention.

Now, a measurement of an ultrasonic propagation time will be explained using FIG. 5. A transmission trigger signal S22 is generated from the trigger circuit 1 at a predetermined transmission repetition intervals $T_0$ and in synchronization with this transmission trigger signal S22, transmission signals A and B are generated from the transmission signal generation circuit 2. In FIG. 5, they have the same waveform, however, these transmission signals A and B are burst pulses with different phases and they have almost equal transmission pulse width $T_1$. The received signals A and B are received an ultrasonic propagation time $t_0$ after the timing of the transmission start. When there is a flow in the tube 8, there is a time difference according to the fluid between the times at which the received signals A and B appear. The amplification circuits 14 and 15 amplify the signals and as a result, transmission leakage signals $S_1$ and $S_2$ and received signals A and B appear respectively.

The outputs of the amplification circuits 14 and 15 are input to the envelope detection circuits 18 and 19. Actually, the transmission leakage signals $S_1$ and $S_2$ and received signals A and B have a difference of approximately 1000 times in intensity, and the transmission leakage signals $S_1$ and $S_2$ have intensity overwhelmingly larger than that of the received signals A and B. The responsivity of the envelope detection circuits 18 and 19 is not so good, and therefore leaving the transmission leakage signals $S_1$ and $S_2$ as they are may prevent the envelopes of the received signals A and B from being taken. Therefore, in this embodiment, the outputs of the envelope detection circuits 18 and 19 are suppressed by the transmission leakage mask signal S23 from the timing circuit 3. While the transmission signals A and B are being output, that is, when the transmission leakage mask signal S23 is high, the outputs of the envelope detection circuits 18 and 19 are suppressed. As a result, only signals corresponding to the received signals A and B appear in the outputs of the envelope detection circuits 18 and 19. A signal which will rise high is output from the binarization circuits 24 and 25 when this envelope signal exceeds a predetermined threshold voltage $Th_1$. At the outputs of the latch circuits 28 and 29, high level signals appear from the leading part of transmission until these binarization circuits 24 and 25 become high, in other words, until the received signals A and B appear.

There is a difference in the pulse width between the outputs of the latch circuits 28 and 29 depending on the speed of the fluid 9 to be measured which flows through the tube 8, however the sum of the pulse widths of the outputs of the latch circuits 28 and 29 is proportional to the sum of the ultrasonic propagation time when there is no flow in the tube 8 and a constant. An ultrasonic propagation time signal voltage $V_0$ which is the output signal from the addition circuit 39 which has added up the outputs of the low pass filters 37 and 38 is expressed by:

$$V_0 = 2 \cdot \frac{t_0 + t_c}{T_0} \cdot V_{cc} \qquad (1)$$

where $T_0$ is a transmission repetition interval, $t_0$ is an ultrasonic propagation time, $V_{cc}$ is the supply voltage level of the latch circuit 28 or 29 and $t_c$ is a constant. In this way, an ultrasonic propagation time $t_0$ can be determined. Since accuracy requirement for the ultrasonic propagation time $t_0$ is not stringent, using the received signals captured by the envelope detection circuits 18 and 19 allows sufficient measurements.

Here, the ultrasonic propagation time $t_0$ is determined using the addition circuit 39, but it is also possible to make an addition by software using the calculation circuit 36. Furthermore, when it is decided that the time difference between the received signals A and B is considerably smaller than the ultrasonic propagation time $t_0$ to be calculated, it is easily understandable that there will be no problem if the ultrasonic propagation time $t_0$ is calculated directly from the low pass filter using only one of the low pass filter 37 and low pass filter 38. Furthermore, since this ultrasonic propagation time $t_0$ relates to the temperature of the fluid 9 in the tube 8, it is easily understandable that it is also possible to measure the temperature of the fluid using this apparatus.

2. Measurement of Flow Velocity

Figure 6:
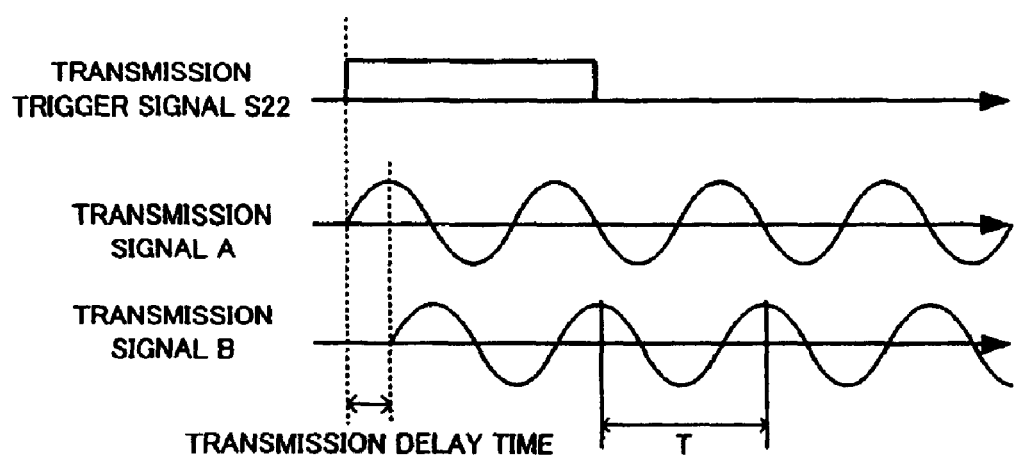
FIG. 6 is a waveform diagram showing a transmission trigger signal and only leading parts of transmission signals A and B during a measurement.

Then, a measurement of a flow velocity will be explained using FIGS. 6 to 8. FIG. 6 shows the transmission trigger signal S22 and only the leading parts of the transmission signals A and B output from the transmission signal generation circuit 2 during the measurement. At this time, the phase control signal S44 is high and the transmission signal B has a phase delay with respect to the transmission signal A which corresponds to the phase difference corresponding to the delay time by the delay circuit 51. That is, the transmission signal A is a burst pulse which starts from the leading part of the transmission trigger signal S22 while the transmission signal B is a burst pulse which starts with a certain delay time $t_p$ from the transmission trigger signal S22 caused by the delay circuit 51. For example, it is decided that the transmission signal A has a phase difference of 90 degrees from the transmission signal B. The number of burst pulses is preferably changeable according to the diameter, etc., of the tube 8. Moreover, the transmission signals A and B preferably have the same number of waves and the same amplitude and also have the same transmission signal cycle T, to be approximately the reciprocal of the frequency at which the ultrasonic transducers 6 and 7 reach maximum sensitivity.

Figure 7:
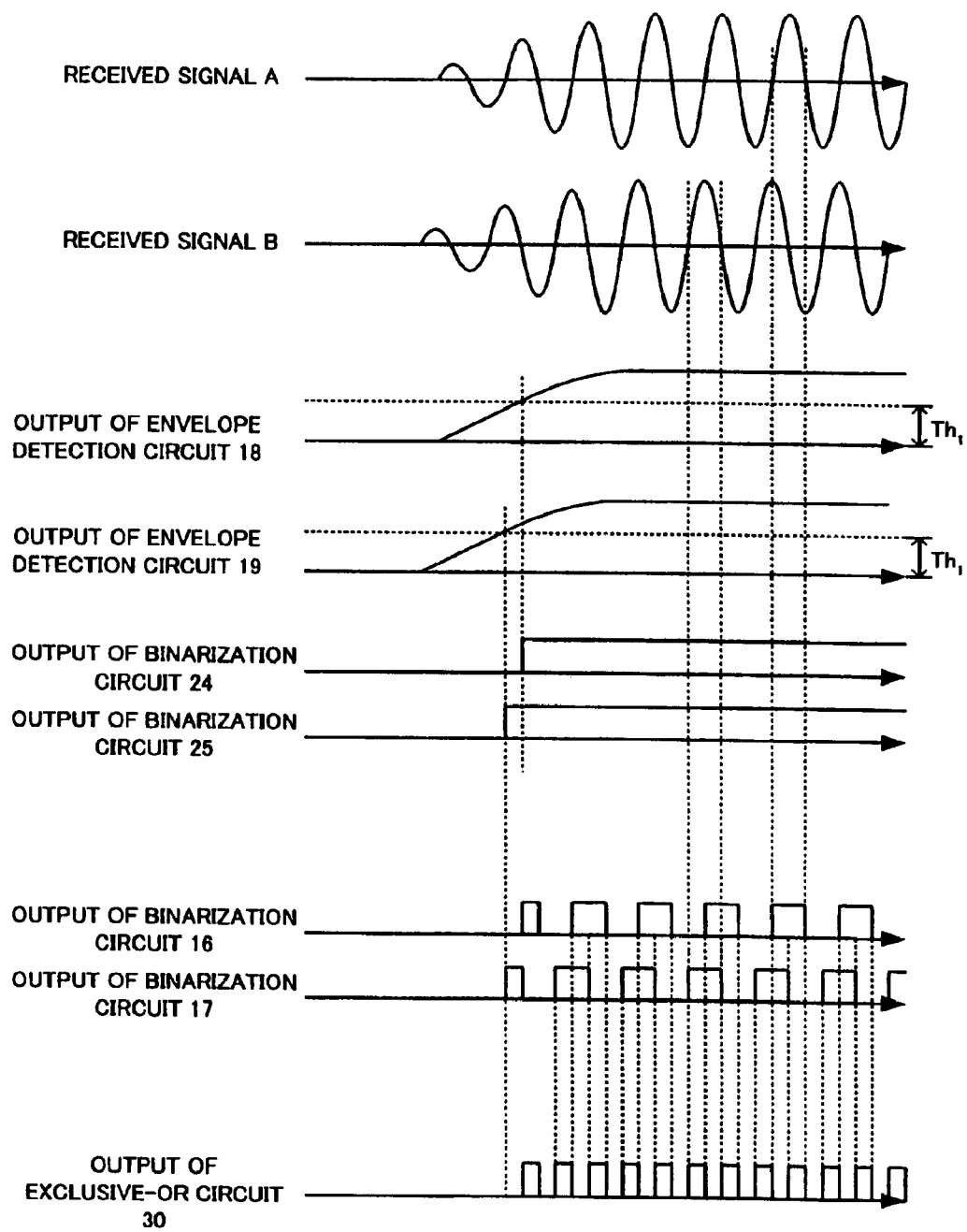
FIG. 7 is a timing chart showing an operation of the circuit near the leading parts of the received signals A and B during a measurement.

FIG. 7 shows the operation of the circuit near the leading parts of the transmission signals A and B when the above described transmission signals A and B are sent as ultrasonic waves from the ultrasonic transducers 6 and 7, propagate through the fluid 9 to be measured in the tube 8 and are received by the opposing ultrasonic transducers 7 and 6. As illustrated, the received signals A and B received by the ultrasonic transducers 6 and 7 have rising parts less sharp than that of the transmission waveform according to the frequency characteristic of the ultrasonic transmission system comprised of the ultrasonic transducers 6 and 7 and tube 8.

The received signals A and B pass through the envelope detection circuits 18 and 19 and binarization circuits 24 and 25. The envelope detection circuits 18 and 19 each output envelop signals which are signals resulting from envelope detection on the received signals A and B and the binarization circuits 24 and 25 output high level signals when these envelope signals exceed the predetermined threshold $Th_1$. For a period during which the binarization circuits 24 and 25 are high, the binarization circuits 16 and 17 output a high level signal only when the received signals A and B exceed 0 V.

Figure 8:
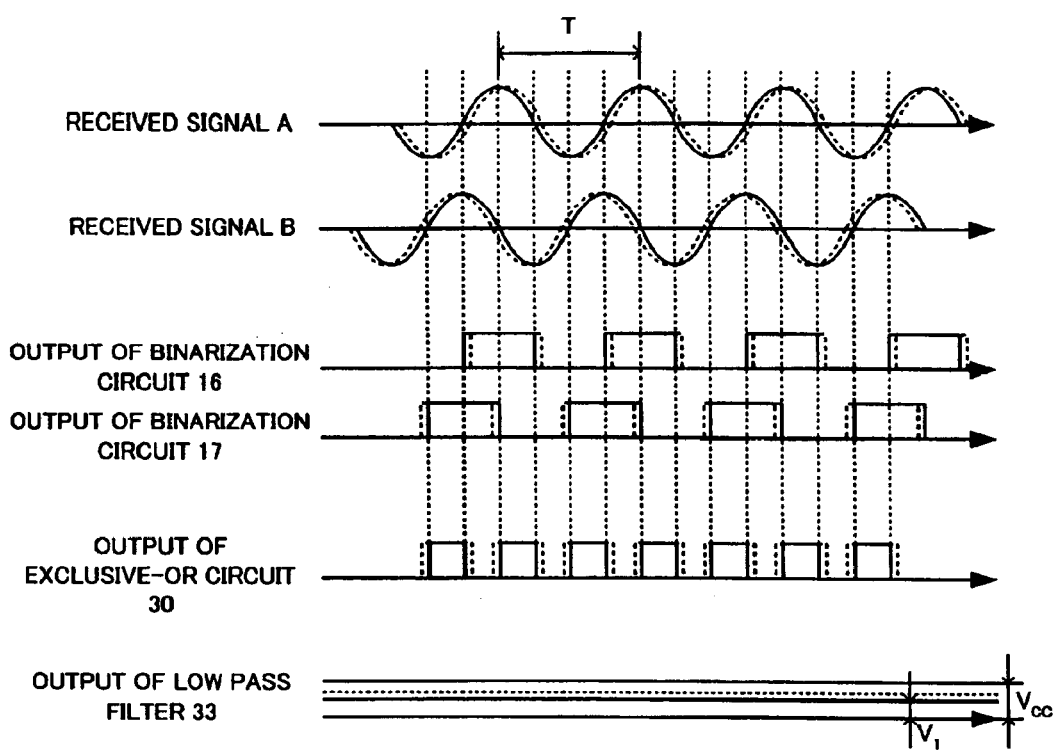
FIG. 8 is a timing chart showing an operation of the circuit near the middle of the reception pulses of the received signals A and B to explain the principle of measurement.

FIG. 8 shows the operations of the subsequent circuits from the binarization circuits 16 and 17 onward near the middle of the reception pulses of the received signals A and B. Solid lines show a case where there is no flow in the tube 8. Because there is a time difference between transmission signals, even if there is no flow in the tube 8 there is a time difference between the received signals A and B and the received signal A has a phase delay of 90 degrees with respect to the received signal B. The received signal cycle T is equal to the cycle of a burst pulse of a transmission signal. The outputs of the binarization circuits 16 and 17 are signals which become high only when the received signals A and B exceed 0 V and can be regarded as signals with only phase information of the received signals A and B extracted. When the binarized received signals are exclusive-ORed by the exclusive OR circuit 30, a resulted pulse string has a duty ratio of 50%. This pulse string is converted to a DC signal by the low pass filter 33. This low pass filter output $V_1$ is:

$$V_1 = \frac{V_{cc}}{2} \quad (2)$$

where $V_{cc}$ is the supply voltage of the exclusive OR circuit 30.

When there is a flow of the fluid 9 to be measured in the tube 8, there is a further time delay for the ultrasonic transducer 6 on the upstream side to receive the signal, while it takes a slightly shorter time for the ultrasonic transducer 7 on the downstream side to receive the signal, which results in the waveform expressed by the dotted lines in FIG. 8. When these waveforms are exclusive-ORed by the exclusive OR circuit 30, a resulted pulse string has a duty ratio exceeding 50%, and therefore the low pass filter output $V_1$ increases as follows:

$$V_1 > \frac{V_{cc}}{2} \quad (3)$$

On the contrary, when the flow velocity is minus, that is, the current flows backward, the low pass filter output $V_1$ decreases. Thus, the low pass filter output $V_1$ varies depending on the flow velocity, and therefore it is possible to A/D-convert the low pass filter output $V_1$ by the A/D-conversion circuit 35 and then input it to the calculation circuit 36 and calculate the flow velocity by the calculation circuit 36.

Figure 9:
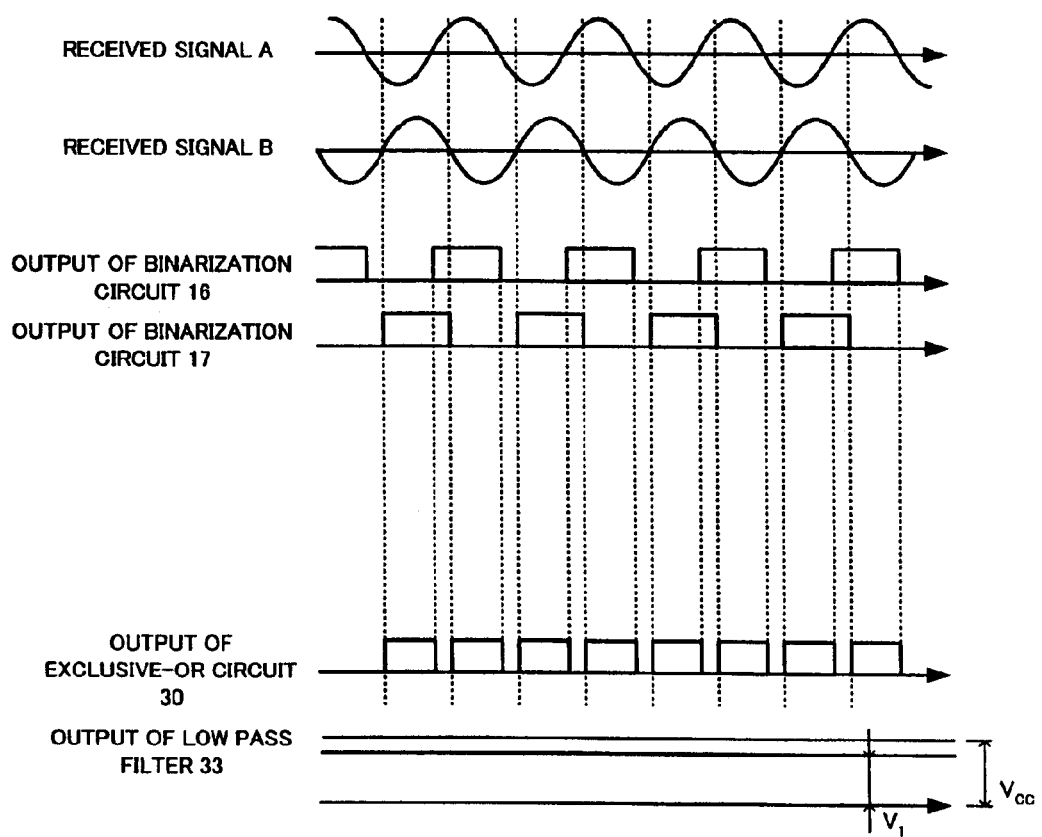
FIG. 9 is a timing chart showing an operation of the circuit near the middle of the reception pulses of the received signals A and B in the case where a flow velocity is detected from a conduit to be measured.

FIG. 9 shows the operation of the circuit near the middle of the reception pulses of the received signals A and B in the case where the phase difference between the pulses of the two transmission signals A and B is 90 degrees, a flow velocity is detected from the fluid 9 to be measured in the tube 8 and there is a phase delay of 45 degrees between the received signals. The further phase difference between the received signals A and B is shifted 45 degrees from the phase difference of the transmission pulses due to the flow in the tube 8 resulting in a delay of 135 degrees. In this case, the result of the exclusive-OR from the exclusive-OR circuit 30 is a pulse string with a duty ratio of 75%. This low pass filter output $V_1$ is:

$$V_1 = \frac{3V_{cc}}{4} \quad (4)$$

where $V_{cc}$ is the supply voltage.

Assuming that the phase difference of the pulses of the two transmission signals is 90 degrees and that a flow causing any phase difference $t_d$ between the two received signals A and B is generated in the tube 8, the phase difference signal $V_1$ which is the output of the low pass filter 33 can be expressed as:

$$V_1 = \frac{T/4 + t_d}{T/2} V_{cc} \quad (5)$$

Figure 2:
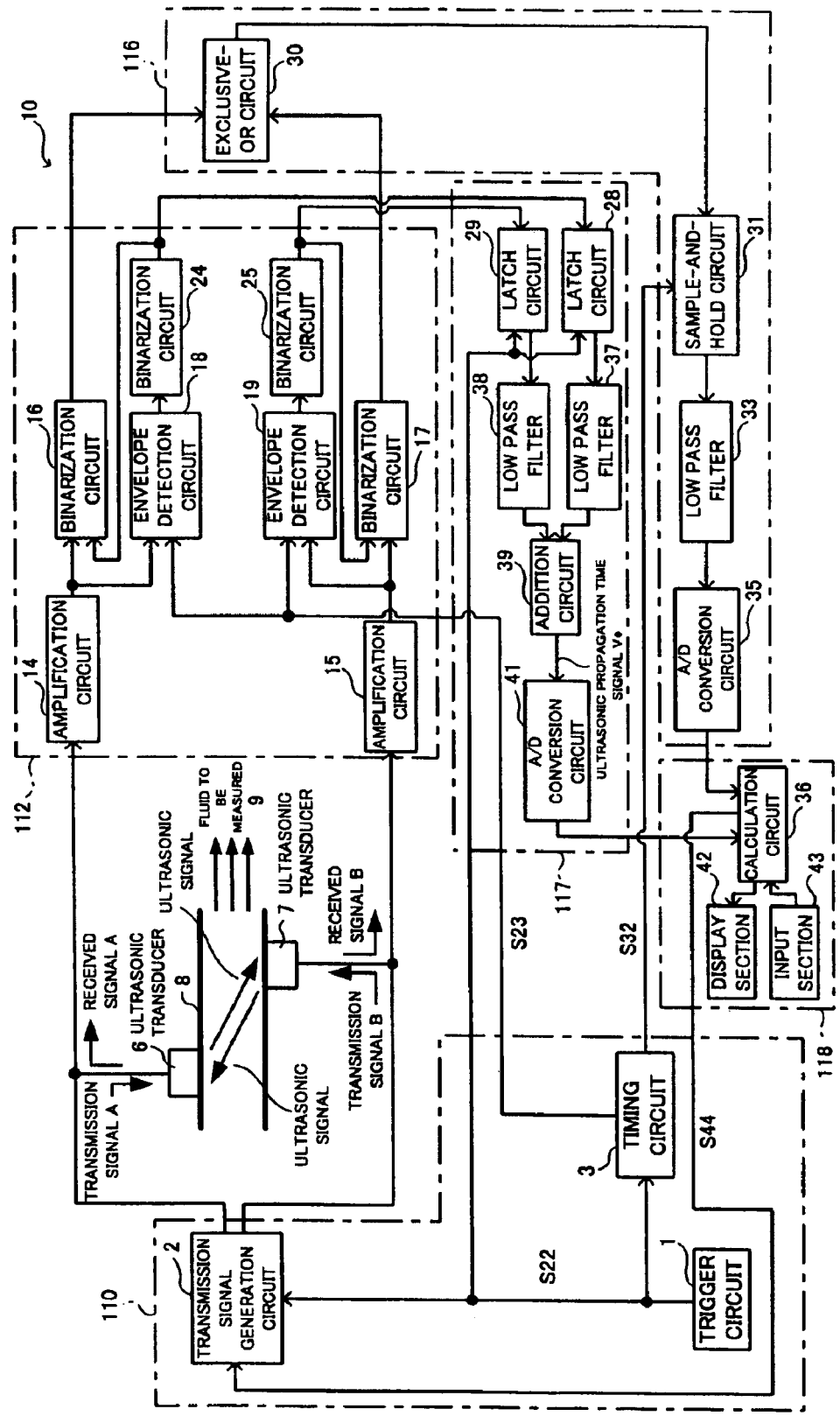
FIG. 2 is a detailed block diagram of FIG. 1.

In this way, it is possible for the apparatus shown in FIG. 1 and FIG. 2 to measure a flow velocity up to a limit flow velocity which causes a time difference corresponding to 90 degrees in terms of the phase of a transmission signal.

$V_0$ and $V_1$ in formula (1) and formula (5) are affected by variations of the supply voltage $V_{cc}$, but by using the same supply voltage $V_{cc}$ as the reference voltage of the A/D conversion circuits 35 and 41 which convert these voltage levels to digital data, it is possible to eliminate influences of this supply voltage $V_{cc}$.

Thus, by calculating a phase difference between burst signals and determining the flow velocity from this phase difference, it is possible to eliminate the need for a high-speed counter with large power consumption, etc., convert the phase difference to a DC voltage through the low pass filter 33, thereby have the effect equivalent to averaging multiple data and allow accurate measurements. Furthermore, the use of a burst signal requires only a pair of transmission/reception ultrasonic transducers 6 and 7 as sensors, making it possible to reduce both the cost and size of the apparatus.

Since the exclusive-OR circuit 30 has poor responsivity to inputs with a tiny time difference, providing the transmission signals A and B with a phase difference allows, even when the flow velocity is small, the exclusive-OR circuit 30 to capture the tiny time difference corresponding to the flow velocity. It is also possible to decide the orientation of the flow velocity with an increment/decrement of the output $V_1$ of this low pass filter 33.

3. Improvement of Sensitivity

Figure 10:
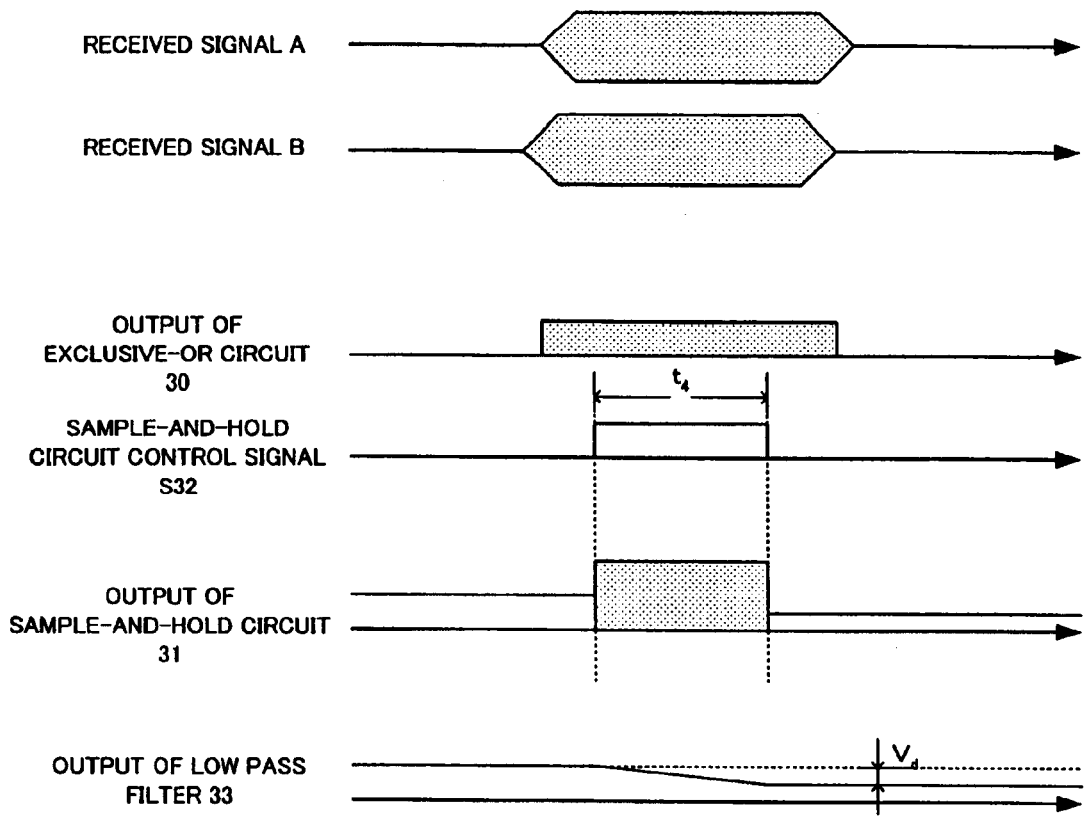
FIG. 10 is a timing chart showing an enlarged view of one reception pulse to explain an operation timing of a sample-and-hold circuit.

The exclusive-OR indicating the phase difference output from the exclusive-OR circuit 30 is filtered by the low pass filter 33 via the sample-and-hold circuit 31. FIG. 10 is a figure to show reception pulses and operation timing of the sample-and-hold circuit 31 and is an enlarged view of only the area where a reception signal pulse is produced. The time at which the reception signal A arrives is behind the time at which the reception signal B arrives, but the period is an extremely short time when viewed from the entire pulse. For periods during which received signals A and B are received, signals are output from the exclusive-OR circuit 30.

The sample-and-hold circuit control signal S32 is intended to extract only an area near the center of the pulse output from the exclusive-OR circuit 30. The sample-and-hold circuit control signal S32 is created by the timing circuit 3 based on the transmission trigger signal S22 and is generally produced at timing equivalent to the area near the center of the received signal.

For a period during which the sample-and-hold circuit control signal S32 is high, the sample-and-hold circuit 31 extracts the output of the exclusive-OR circuit 30 and for a period during which the sample-and-hold circuit control signal S32 is low, the sample-and-hold circuit 31 becomes high impedance and holds the output of the low pass filter 33.

The output of the low pass filter 33 is obtained by removing a high frequency component from the output of the sample-and-hold circuit 31 and its voltage corresponds to the flow velocity. When the time constant of the low pass filter 33 is relatively small, the difference between the flow velocity at the time of previous transmission/reception of ultrasonic wave and the flow velocity at the current time appears to the output of the low pass filter 33 as a displacement voltage $V_d$.

Thus, by extracting only the middle part where a signal is output from the exclusive-OR circuit 30 by means of the sample-and-hold circuit control signal S32, it is possible to remove influences of the instability of phase information which occurs due to insufficient sensitivity, etc., near both ends of the pulse of the output of the exclusive-OR circuit 30, use the part with the largest amplitude of the received signal and thereby improve sensitivity.

For a sample-and-hold period $t_4$ during which the sample-and-hold circuit control signal S32 is high, it is preferable to precisely set the output of the low pass filter 33 to a multiple of a transmission signal cycle so that the output of the low pass filter 33 is accurately reflected in the flow velocity. It is possible to easily realize the setting of such a period using a logical circuit.

4. Corrective Measurement

In the configuration explained above, drift components may be produced in measured voltage $V_1$ due to variation in the phase difference between the transmission signals A and B and variation in the operating speeds of the binarization circuits 16 and 17 and it is preferable to remove this drift component through corrections. Corrections are therefore made periodically.

Thus, the aforementioned phase control signal S44 is output from the calculation circuit 36 in response to input from the input section 43 or periodically. When the phase control signal S44 becomes low, in the transmission signal generation circuit 2, as shown in FIG. 3, the burst signal output from the AND circuit 48 is directly output from the OR circuit 57 through the AND circuit 55 to become a transmission signal B. At the same time, the burst signal output from the AND circuit 48 is converted by the delay circuit 51 to a burst signal with a phase delay of 90 degrees, output from the OR circuit 56 through the AND circuit 53 to become a transmission signal A.

Figure 11:
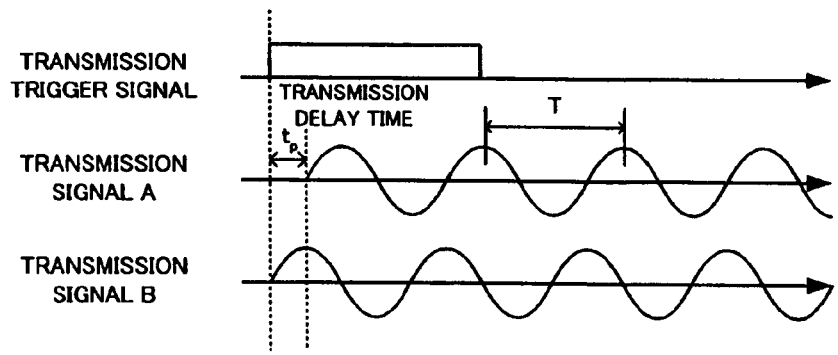
FIG. 11 is a waveform diagram showing a transmission trigger signal and, only the leading parts of transmission signals A and B during a corrective measurement.

FIG. 11 shows only the area near the leading part of the transmission signal during a corrective measurement. In this state, with regard to the transmission signals A and B, the time difference between the transmission signals A and B in FIG. 6 is reversed. It is preferable to make the transmission time difference equal to the transmission time difference during a normal measurement.

During a corrective measurement, the transmission signals A and B are directly input to the amplification circuits 14 and 15 without passing through the inside of the tube 8 as the received signals A and B respectively. In this case, in order to prevent adverse influences by saturation, it is preferable that the amplification circuits 14 and 15 be able to change their gains so that the gains should be decreased according to transmission leakage during a corrective measurement. Furthermore, the transmission leakage mask signal S23 is disabled and the sample-and-hold circuit control signal S32 is changed over to a pulse signal to become high not at the time at which the ultrasonic signal propagates through the tube 8 and is received but at the time at which a transmission signal exists. The remaining circuits operate as explained so far, resulting in a voltage $V_s$ according to the phase difference between the transmission leakage signals as a phase difference signal.

In the actual circuits, there are variations in the performance of circuit elements. Now assuming that the time difference between the transmission signals A and B is $t_p$, difference in the delay time from the amplification circuits 14 and 15 to the exclusive-OR circuit 30 is $t_e$ and delay time due to the flow velocity is $t_d$, then phase difference signal $V_1$ during a normal measurement is:

$$V_1 = \frac{t_p + t_e + t_d}{T/2} V_{cc} \qquad (6)$$

Phase difference signal $V_s$ during a corrective measurement is:

$$V_s = \frac{t_p + t_e}{T/2} V_{cc} \qquad (7)$$

Therefore, the difference $V_1 - V_s$ between these signals is:

$$V_1 - V_s = \frac{t_d}{T/2} V_{cc} \qquad (8)$$

That is, when the apparatus is controlled so that the calculation circuit 36 measures the phase difference signal $V_s$ during a corrective measurement periodically and when the deviation from the normally measured phase difference signal $V_1$ is calculated, then it is possible to remove a drift component generated in the phase difference signal $V_1$ during a normal measurement due to variations in the operating speeds of the binarization circuits 16 and 17, from the voltage, and consequently measure the flow velocity with a high degree of accuracy. In order to achieve high accuracy through a corrective measurement, it is preferable that the signal propagation delay time of each logical circuit in FIG. 3 be as identical as possible.

5. Expansion of Measurement Flow Velocity Range

Figure 12:
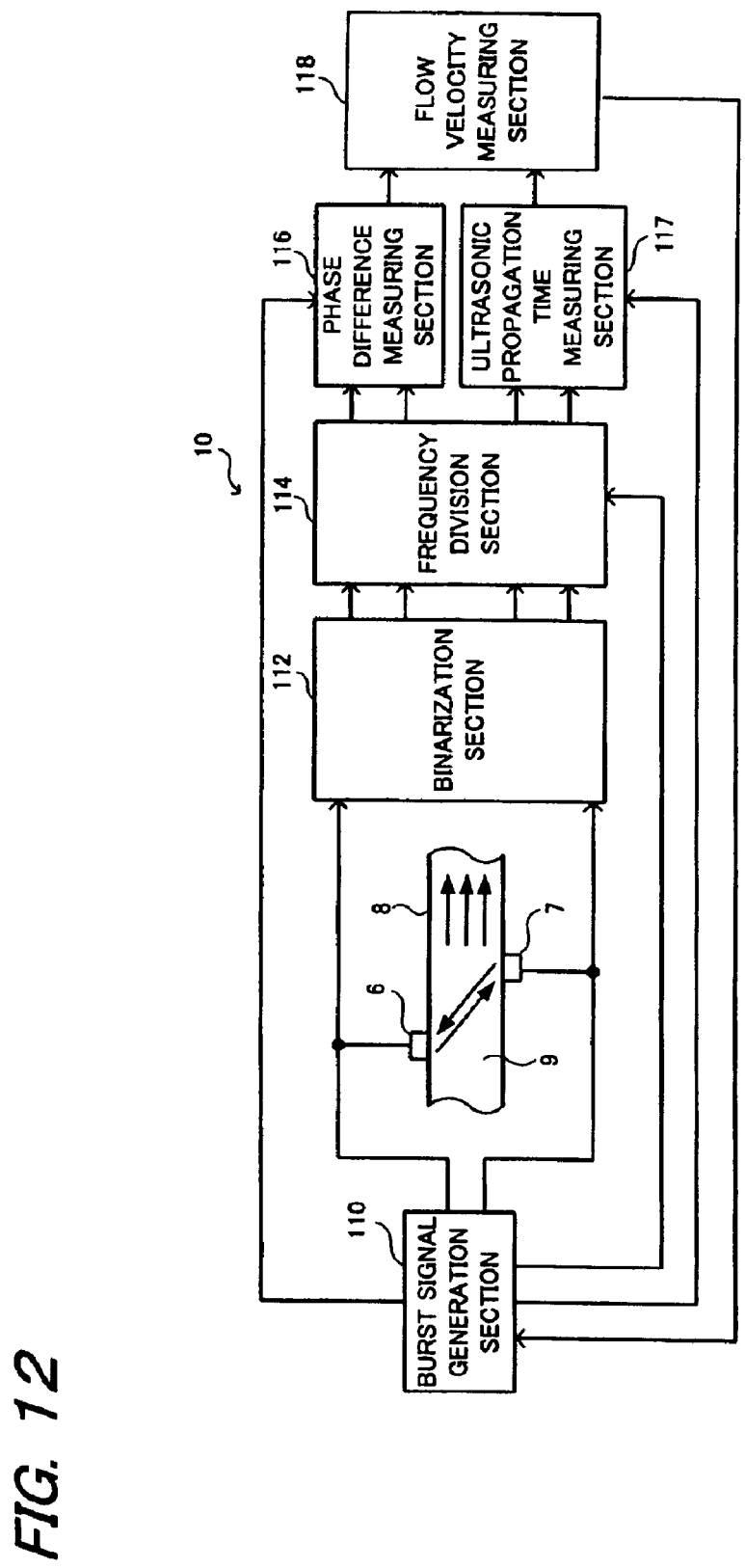
FIG. 12 is an overall block diagram of an ultrasonic flow velocity meter of the present invention preferred to enlarge a range of measuring flow velocity.
Figure 13:
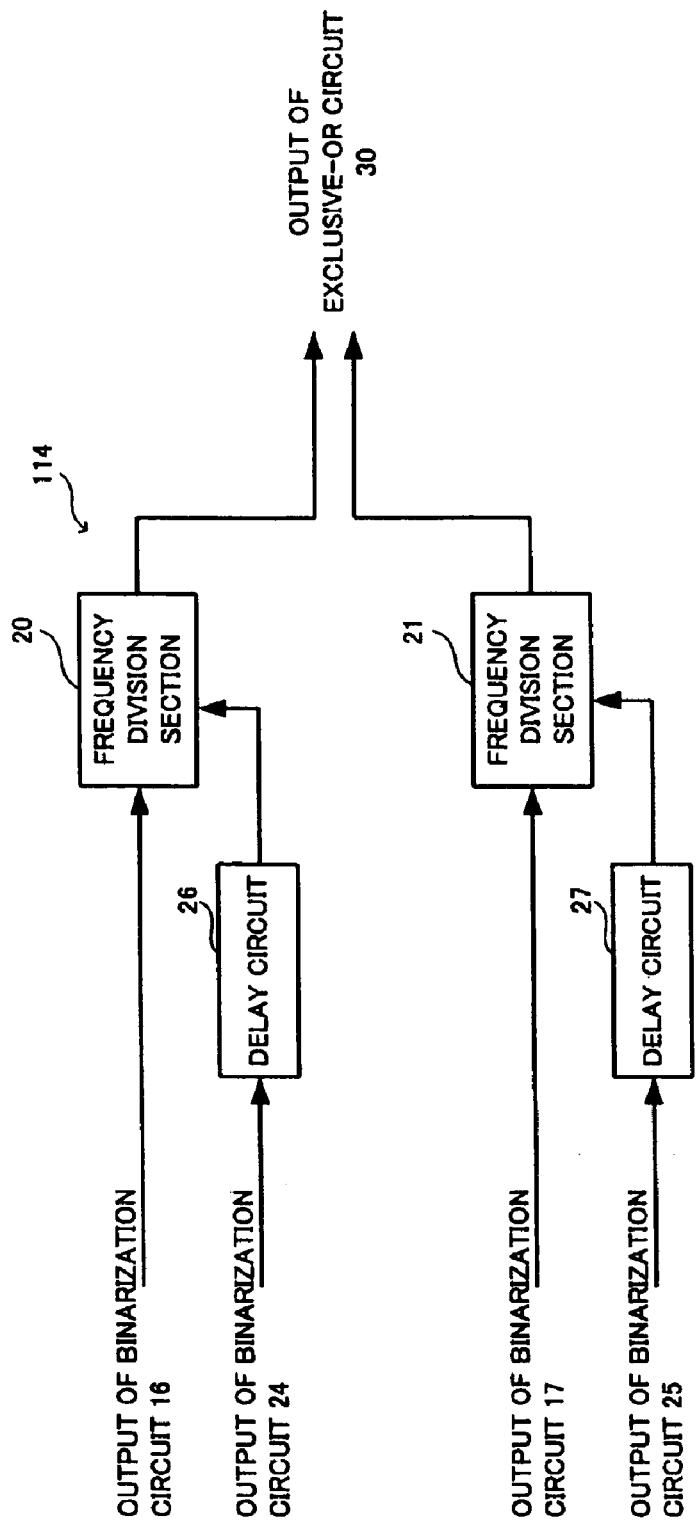
FIG. 13 is a detailed block diagram of the frequency division section in FIG. 12.

Now, with the above described configurations in FIG. 1 and FIG. 2, when the flow velocity of the fluid 9 to be measured increases and the phase difference between the received signals A and B is shifted by 180 degrees or more, it is no longer possible to distinguish whether the output from the exclusive-OR circuit 30 is greater or smaller than 180 degrees. That is, the measurement flow velocity range is a range in which the phase difference between the received signals A and B is 0 degrees to 180 degrees and there is a limit to the measurement flow velocity range. Therefore, to expand the measurement flow velocity range, as shown in FIG. 12, a frequency division section 114 is provided between the binarization section 112 and phase difference measuring section 116 and the ultrasonic propagation time measuring section 117. FIG. 13 is a block diagram showing a detailed configuration of the frequency division section 114. The frequency division section 114 is constructed of a frequency division circuits 20 and 21 and delay circuits 26 and 27.

The outputs of the binarization circuits 16 and 17 are connected to the clock input terminals of the frequency division circuits 20 and 21 and the outputs of the binarization circuits 24 and 25 are connected to the inputs of the delay circuits 26 and 27. The outputs of the delay circuits 26 and 27 are connected to the reset terminals of the frequency division circuits 20 and 21. The outputs of the frequency division circuits 20 and 21 are connected to the input of the exclusive-OR circuit 30.

Figure 14:
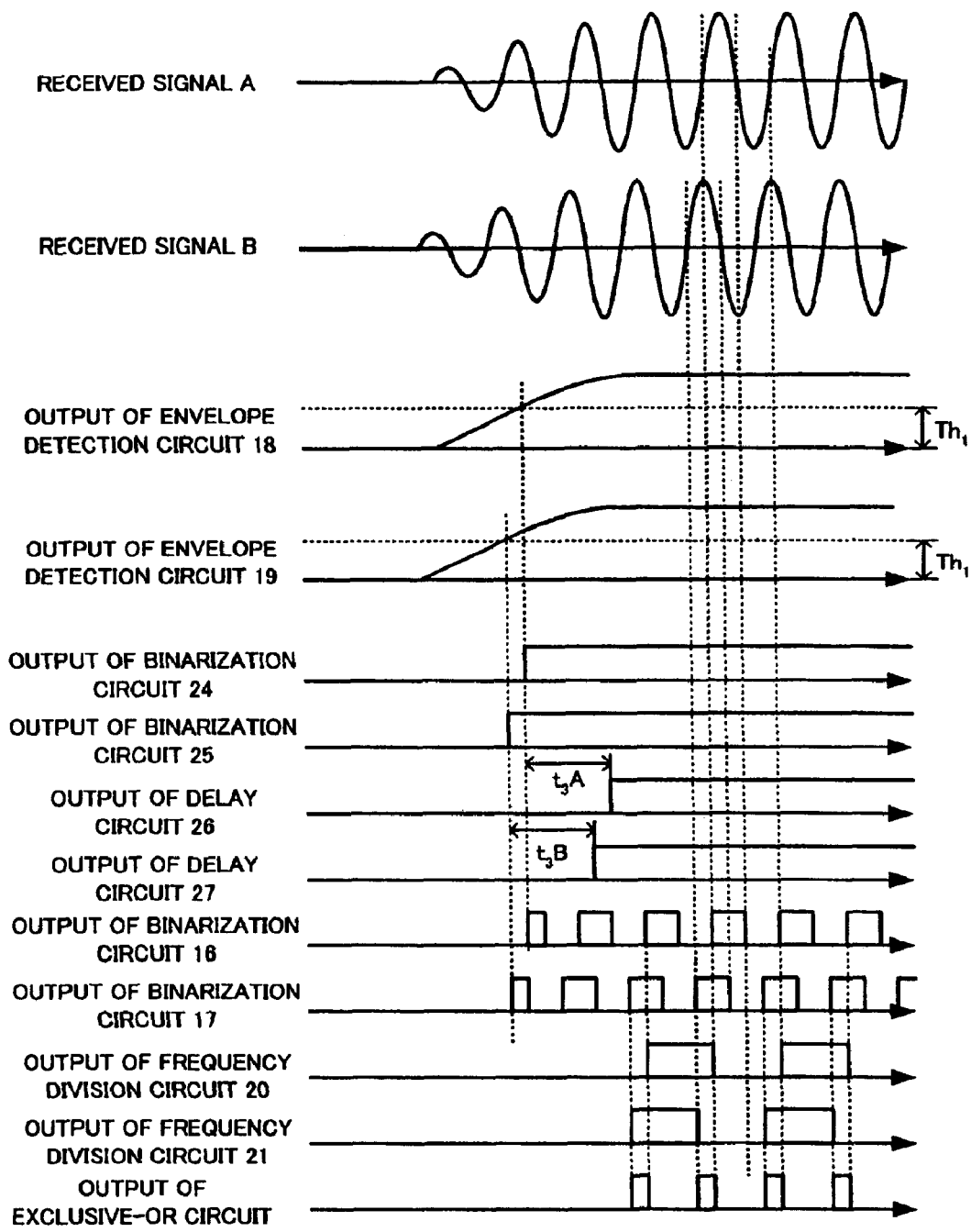
FIG. 14 is a timing chart showing an operation of the circuit near the leading parts of the received signals A and B of the ultrasonic flow velocity meter in FIG. 12.

FIG. 14 shows an operation of the circuit near the leading parts of the received signals A and B when this frequency division section is used.

The received signals A and B pass through the envelope detection circuits 18 and 19 and binarization circuits 24 and 25. The envelope detection circuits 18 and 19 output envelope signals obtained by performing envelope detection on the received signals A and B respectively and the binarization circuits 24 and 25 output high level signals when these envelope signal exceed a predetermined threshold $Th_1$. The delay circuits 26 and 27 output signals with predetermined delay times $t_3A$ and $t_3B$ with respect to these signals. These delay times $t_3A$ and $t_3B$ are set to eliminate the parts of the received signals which rise unstably and start frequency division from the stable parts so that even when the received signals A and B move due to variations in the flow velocity of the fluid, they move according to these signals. The delay times $t_3A$ and $t_3B$ are normally the same and it is preferable that the circuit constants be set in such a way that the rising edges of the output of the delay circuit 26 and the output of the delay circuit 27 match the falling edges of the output of the binarization circuit 16 and the output of the binarization circuit 17 as much as possible respectively. The frequency division circuits 20 and 21 output signals that transit their status at the timings of the rising edges of the outputs of the binarization circuits 16 and 17 only when the output of the delay circuit 26 and the output of the delay circuit 27 are high. The initial values of the outputs of the frequency division circuits 20 and 21 are the same for each transmission and in order to generate such signals, the frequency division circuits 20 and 21 can be easily realized with a logic circuit which uses the outputs of the binarization circuits 16 and 17 as clocks and uses the outputs of the delay circuits 26 and 27 as asynchronous reset signals with negative logic. The output of the exclusive-OR circuit 30 is the result of the exclusive-OR between the output of the frequency division circuit 20 and the output of the frequency division circuit 21 and becomes a pulse string with widths in response to the time difference between the received signals A and B.

Figure 15:
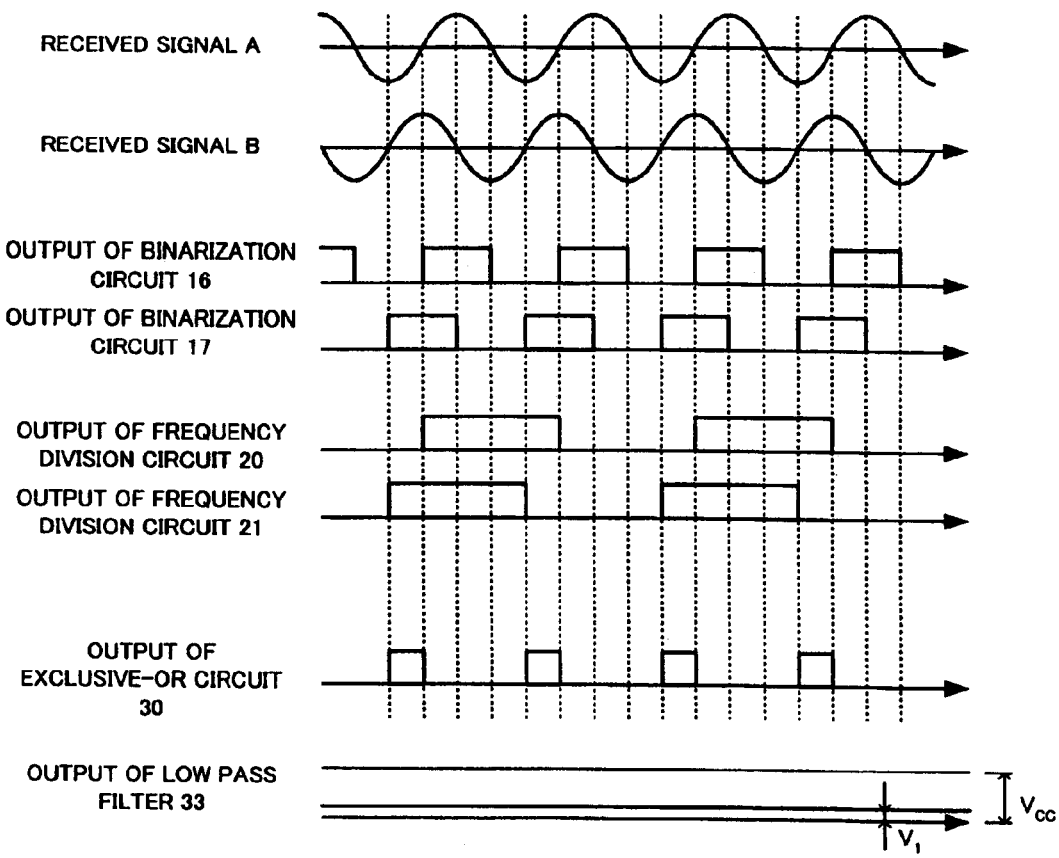
FIG. 15 is a timing chart showing an operation of the circuit near the middle of reception pulses of the received signals A and B when no flow velocity of the conduit to be measured is detected by the ultrasonic flow velocity meter in FIG. 12.

FIG. 15 is a figure showing the operation of the circuit near the middle of the reception pulses of the received signals A and B. FIG. 15 shows the case where no flow exists in the tube 8. The phase difference between the received signals A and B is 90 degrees and the phase difference between the received signals A and B becomes equal to the phase difference between the transmission pulses because no flow exists in the tube 8 and as a result it is shifted by 90 degrees. After the frequency division circuits 20 and 21 perform first stage frequency division, exclusive-OR is taken and as a result, the result of the exclusive-OR is a pulse string with a duty ratio of 25%. The output $V_1$ of the low pass filter 33 is:

$$V_1 = \frac{V_{cc}}{4} \qquad (9)$$

where $V_{cc}$ is the supply voltage.

Figure 16:
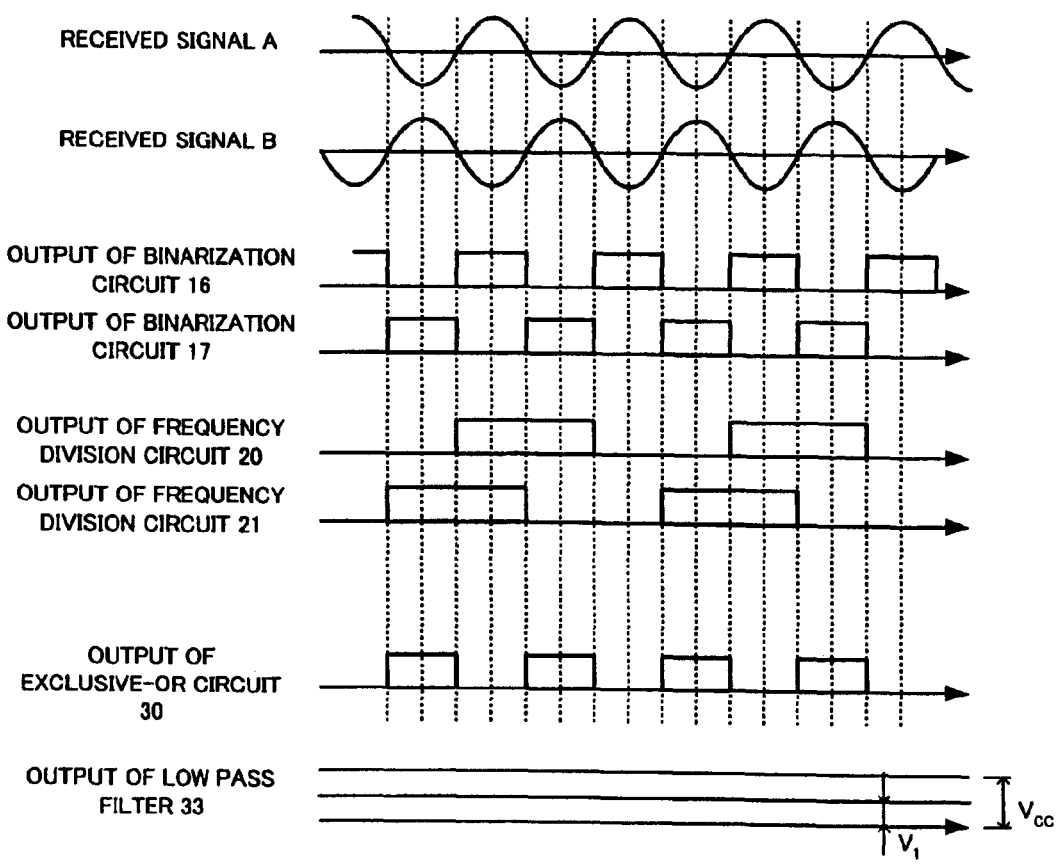
FIG. 16 is a timing chart showing an operation of the circuit near the middle of the reception pulses of the received signals A and B when a flow velocity of the conduit to be measured is detected by the ultrasonic flow velocity meter in FIG. 12.

FIG. 16 shows the operation of the circuit near the middle of the pulses of the received signals A and B when a phase difference of the pulses of the two transmission signals A and B is 90 degrees and when a flow velocity of the fluid 9 to be measured in the tube 8 is detected and the received signals have a further phase delay of 90 degrees. The phase difference between the received signals A and B is further shifted by 90 degrees from the phase difference between the transmission pulses due to the flow in the tube 8 and as a result, it is a phase shift of 180 degrees. In this case, the result of the exclusive-OR from the exclusive-OR circuit 30 becomes a pulse string with a duty ratio of 50%. This low pass filter output $V_1$ is:

$$V_1 = \frac{V_{cc}}{2} \qquad (10)$$

where $V_{cc}$ is the supply voltage.

Now, assuming that the phase difference between the two transmission signal pulses is 90 degrees and if a flow causing a phase difference $t_d$ to be produced between the two transmission signals is generated in the tube 8, the phase difference signal $V_1$ which is the output $V_1$ of the low pass filter 33 can be expressed as:

$$V_1 = \frac{T/4 + t_d}{T} V_{cc} \tag{11}$$

In this way, it can be appreciated that it is possible to measure a flow velocity that will generate a phase difference of up to 270 degrees between the two received signals A and B. Thus, assuming that the frequency dividing ratio is 2, it is possible to widen the measuring range twice. By selecting an appropriate dividing ratio, for example by changing it in a range from approximately 1 to 5, it is possible to widen the measuring range. FIG. 13 has shown a one-stage frequency division circuit as an example, but connecting a plurality of similar frequency division circuits in tandem can further expand the measuring flow velocity range.

6. Corrective Measurement 2

Figure 17:
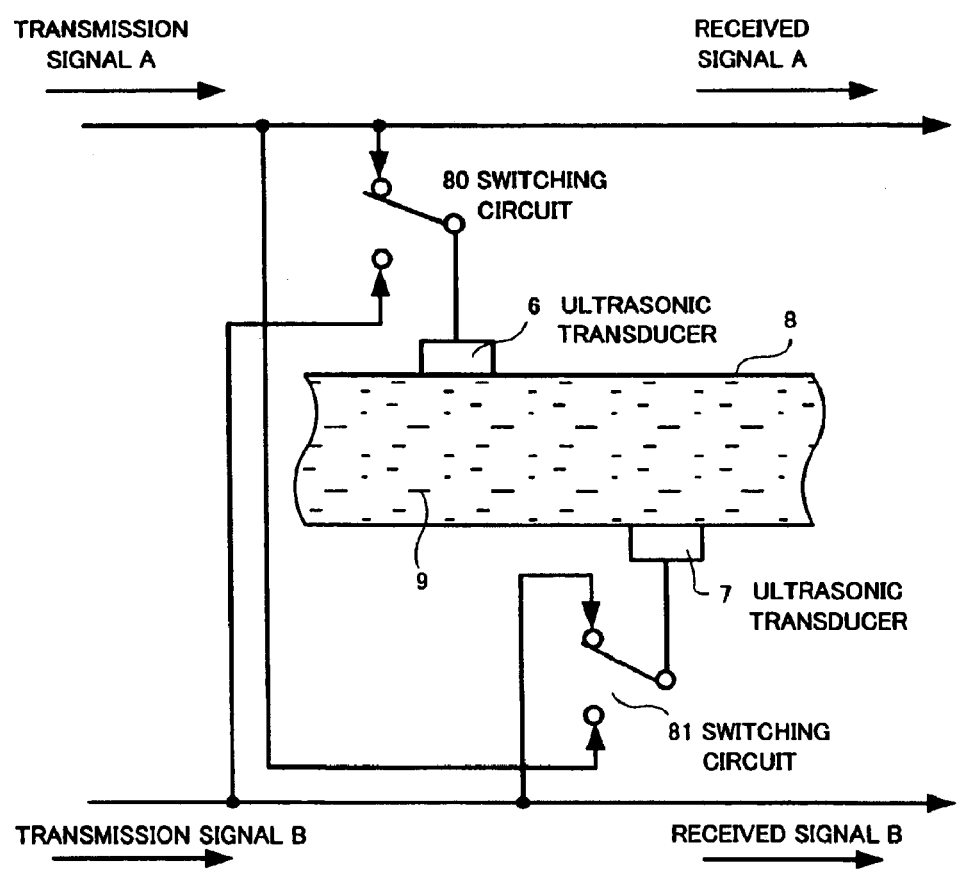
FIG. 17 is a configuration diagram around ultrasonic transducers showing another example of corrective measurement.

FIG. 17 shows a configuration example with switching circuits attached to the respective terminals of a pair of ultrasonic transducers 6 and 7, which serves as a substitute for the phase switching circuit shown in FIG. 3 explained in "4. Corrective measurement." Therefore, when the switching circuits shown in FIG. 17 exist, there is no need for the function of switching phases in FIG. 3.

As shown in FIG. 17, the switching circuits 80 and 81 are provided between the burst signal generation section 110 and binarization section 112 and the transmission signal A is input to either the ultrasonic transducer 6 through the switching circuit 80 or the ultrasonic transducer 7 through the switching circuit 81. Likewise, the transmission signal B is input to either the ultrasonic transducer 7 through the switching circuit 81 or the ultrasonic transducer 6 through the switching circuit 80. The received signal A is either an ultrasonic signal received by the ultrasonic transducer 6 selected by the switching circuit 80 or the ultrasonic transducer 7 selected by the switching circuit 81. Likewise, the received signal B is either an ultrasonic signal received by the ultrasonic transducer 7 selected by the switching circuit 81 or the ultrasonic transducer 6 selected by the switching circuit 80. The switching directions of the switching circuits 80 and 81 are designed to change simultaneously. Furthermore, when the frequency division section 114 shown in FIG. 13 is provided, it is preferable to provide a mechanism for switching the polarity of the output of the binarization circuit 16 in connection with the switching circuits 80 and 81 in FIG. 17.

Figure 18:
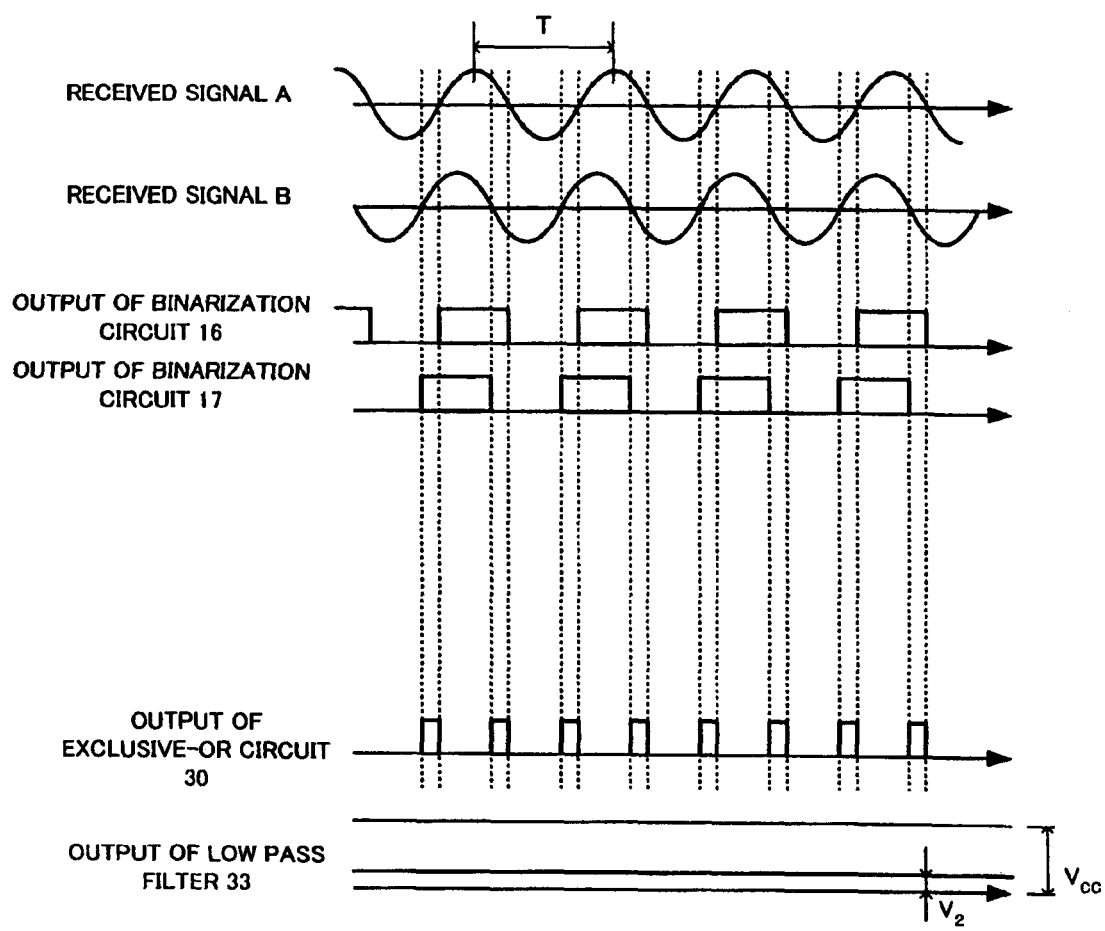
FIG. 18 is a timing chart showing an operation of the circuit near the middle of the reception pulses of the received signals A and B when the switching circuit in FIG. 17 is oriented opposite to the direction indicted in FIG. 17 and when a flow velocity of the conduit to be measured is detected.

Assuming that the switching circuits 80 and 81 are in a switching position opposite to the switching position shown in FIG. 17, FIG. 18 shows the operation of the circuit near the middle of the reception pulses of the received signals A and B when there is a delay causing a phase shift of 45 degrees between the received signals through the flow in the tube 8. When the switching circuits 80 and 81 are in the switching positions shown in FIG. 17, the operation is the same as that shown in FIG. 9.

In FIG. 18, the phase difference between the received signals A and B becomes 45 degrees, which is the result of subtracting a phase difference of 45 degrees produced by the flow in the tube 8 from the phase difference 90 degrees produced in the transmission signal. In this case, the exclusive-OR result from the exclusive-OR circuit 30 becomes a pulse string with a duty ratio of 25%. This low pass filter output $V_1$ is:

$$V_2 = \frac{V_{cc}}{4} \tag{12}$$

where $V_{cc}$ is the supply voltage. That is, when the circuit shown in FIG. 17 is used, if each switching circuit in FIG. 17 is as shown in FIG. 17, the low pass filter output $V_1$ increases in proportion to the flow velocity in the tube 8 and when each switching circuit in FIG. 17 is in a switching position opposite to the switching position shown in FIG. 17, the low pass filter output $V_2$ decreases in proportion to the flow velocity.

In the actual circuit, there are variations in the performance of the circuit elements. Now, assuming that a time difference between the transmission signals A and B is $t_p$, difference in the delay time from the amplification circuits 14 and 15 to the exclusive-OR circuit 30 is $t_e$ and delay time to the flow velocity is $t_d$, then the low pass filter output $V_1$ in the position of the switching circuit shown in FIG. 17 is:

$$V_1 = \frac{t_p + t_e + t_d}{T/2} V_{cc} \tag{13}$$

where T is the cycle of the received signal. On the other hand, in the switching position opposite to the switching position shown in FIG. 17, $$V_2 = \frac{t_p + t_e - t_d}{T/2} V_{cc} \tag{14}$$

The difference between $V_1$ and $V_2$ is calculated by the calculation circuit as:

$$V_1 - V_2 = \frac{t_d}{T} V_{cc} \tag{15}$$

This means that the influences of the time difference $t_p$ between the transmission signals A and B, the difference $t_e$ in the delay time from the reception circuits to the exclusive-OR circuit 30 can be eliminated, and it is consequently possible to eliminate influences of variations in the performance of elements and difference in the temperature characteristic and allow high accuracy flow velocity measurements.

Figure 19:
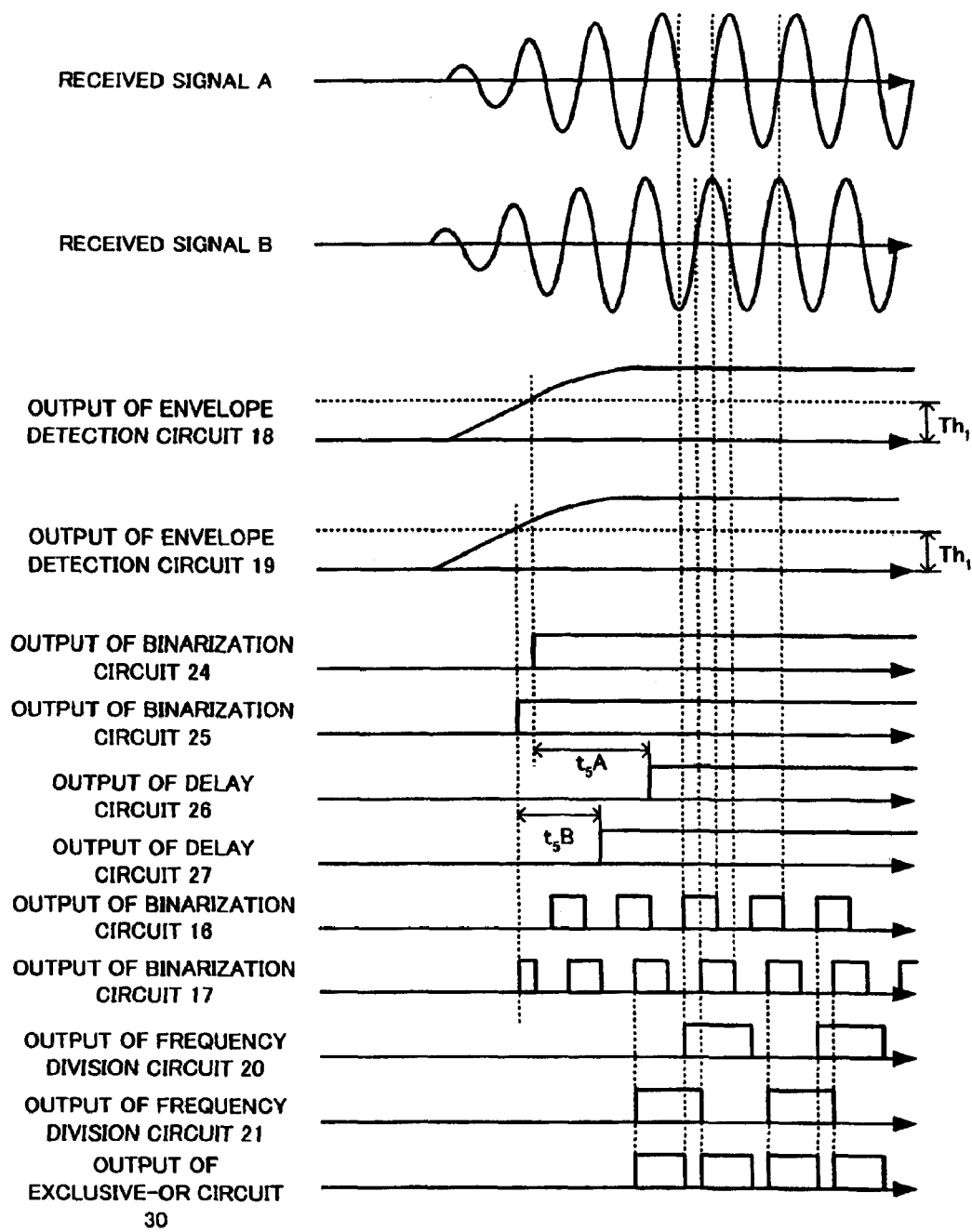
FIG. 19 is a timing chart showing an operation of the circuit near the leading parts of the received signals A and B when the switching circuit in FIG. 17 is oriented opposite to the direction indicted in the ultrasonic flow velocity meter in FIG. 12 and when no flow velocity of the conduit to be measured is detected.

Then, FIG. 19 shows the operation of the circuit near the leading part of the received signals A and B when the switching circuit shown in FIG. 17 and the frequency division section 114 shown in FIG. 12 are combined and each switching circuit shown in FIG. 17 is in a switching position opposite to the switching position shown in FIG. 17 and no flow exists in the tube 8. When each switching circuit 80 or 81 is in the switching position shown in FIG. 17, it is the same as that shown in FIG. 14.

In FIG. 19, the signal received at the ultrasonic transducer 7 is the received signal A, while signal received at the ultrasonic transducer 6 is the received signal B. When compared with the received signals A and B in FIG. 14, the received signals A and B alternate with each other due to the changeover switches. The output of the envelope detection circuit 18 and the output of the envelope detection circuit 19 show waveforms which have detected the received signals A and B respectively and the output of the binarization circuit 24 and the output of the binarization circuit 25 are obtained by binarizing the output of the envelope detection circuit 18 and the output of the envelope detection circuit 19 using the threshold voltage $Th_1$ and this threshold voltage $Th_1$ is the same voltage as the threshold voltage in previous FIG. 14. The output of the delay circuit 26 and the output of the delay circuit 27 are obtained by delaying the output of the binarization circuit 24 and the output of the binarization circuit 25 by a delay time $t_5A$ and delay time $t_5B$. When each switching circuit shown in FIG. 17 is in the position shown in FIG. 17, the output of the binarization circuit 16 becomes high when the received signal A exceeds 0 V, while each switching circuit shown in FIG. 17 is in the position opposite to that shown in FIG. 17, the output of the binarization circuit 16 becomes high when the received signal A is lower than 0 V. On the other hand, the output of the binarization circuit 17 becomes high when the received signal B exceeds 0 V irrespective of the switching position of the switching circuit in FIG. 17. It is preferable that the circuit constants be set for the delay time $t_5A$ and delay time $t_5B$ in such a way that the rising edges of the output of the delay circuit 26 and the output of the delay circuit 27 match the falling edges of the output of the binarization circuit 16 and the output of the binarization circuit 17 as much as possible respectively. Therefore, depending on the position of each switching circuit in FIG. 17, the delay time $t_5A$ must be changed in such a way as to be different from the delay time $t_3A$. The output of the exclusive-OR circuit 30 is a result of exclusive-OR between the output of the frequency division circuit 20 and the output of the frequency division circuit 21 and becomes a pulse string with the width according to the time difference between the received signals A and B.

Figure 20:
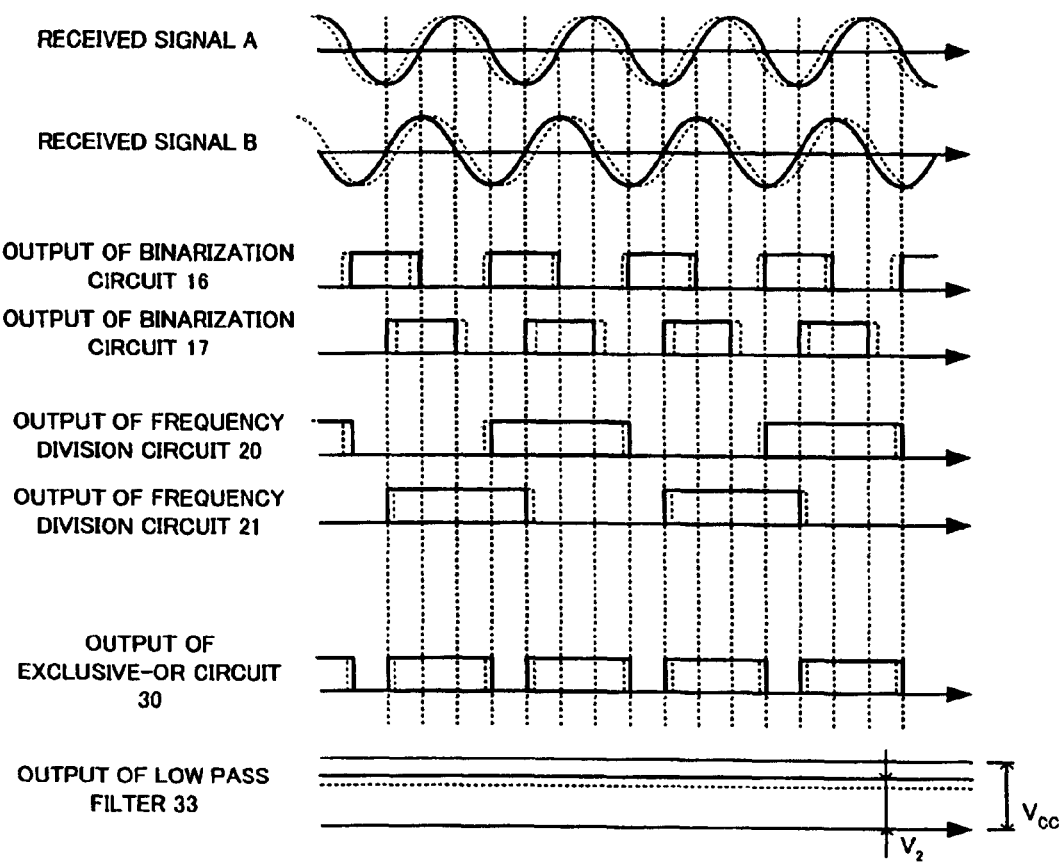
FIG. 20 is a timing chart showing an operation of the circuit near the middle of the reception pulses of the received signals A and B when the switching circuit in FIG. 17 is oriented opposite to the direction indicted in the ultrasonic flow velocity meter in FIG. 12.

FIG. 20 shows an operation of the circuit near the middle of the reception pulses of the received signals A and B in the case where the switching circuit shown in FIG. 17 is combined with the frequency division section 114 shown in FIG. 12 and each switching circuit in FIG. 17 is in a position opposite to the position shown in FIG. 17, while when the phase difference between the transmission signal A and received signal B is 90 degrees and there is no flow in the tube 8. If each switching circuit in FIG. 17 is as shown in FIG. 17, the operation of the circuit near the middle of the reception pulses becomes the same as that shown in FIG. 15. When each switching circuit in FIG. 17 is in a state opposite to that in FIG. 17, the output of the binarization circuit 16 becomes high when the received signal A falls below 0 V and the output of the binarization circuit 17 only becomes high when the received signal B exceeds 0 V. The output of the exclusive-OR circuit 30 is the result of exclusive-ORing the outputs of the frequency division circuits 20 and 21 and becomes a pulse string with a duty ratio of 75% in this case. This low pass filter output $V_2$ is:

$$V_2 = \frac{3V_{cc}}{4} \quad (16)$$

where $V_{cc}$ is the supply voltage. When there is a certain level of flow in the tube 8, signals change as shown by dotted lines and the low pass filter output $V_2$ decreases consequently.

In the actual circuit, there are variations in the performance of the circuit elements. Now, assuming that a time difference between the transmission signals A and B is $t_p$, difference in the delay time from the amplification circuits 14 and 15 to the exclusive-OR circuit 30 is $t_e$ and delay time due to the flow rate is $t_d$, then the low pass filter output $V_1$ in the positions of the switching circuits shown in FIG. 17 is:

$$V_1 = \frac{(t_p + t_e + t_d)}{T} V_{cc} \quad (17)$$

where T is the cycle of the received signal. On the other hand, in the switching position opposite to the switching circuit position shown in FIG. 17, $$V_2 = \frac{T/2 + t_p + t_e - t_d}{T} V_{cc} \quad (18)$$

The difference between $V_1$ and $V_2$ is calculated by the calculation circuit as:

$$V_2 - V_1 = \frac{-T/2 + 2 + 2t_d}{T} V_{cc} \quad (19)$$

This means that influences of the time difference $t_p$ between the transmission signals A and B, the difference $t_e$ in the delay time from the amplification circuits 14 and 15 to the exclusive-OR circuit 30 can be eliminated, and it is consequently possible to eliminate influences of variations in the performance of elements and difference in the temperature characteristic and allow high accuracy flow rate measurements. The above described example has described the case with one-stage frequency division circuit, but it is easily understandable that even if a plurality of frequency division circuits are connected in tandem, the flow velocity can be measured accurately using the same method.

7. Reduction of Power Consumption

Figure 21:
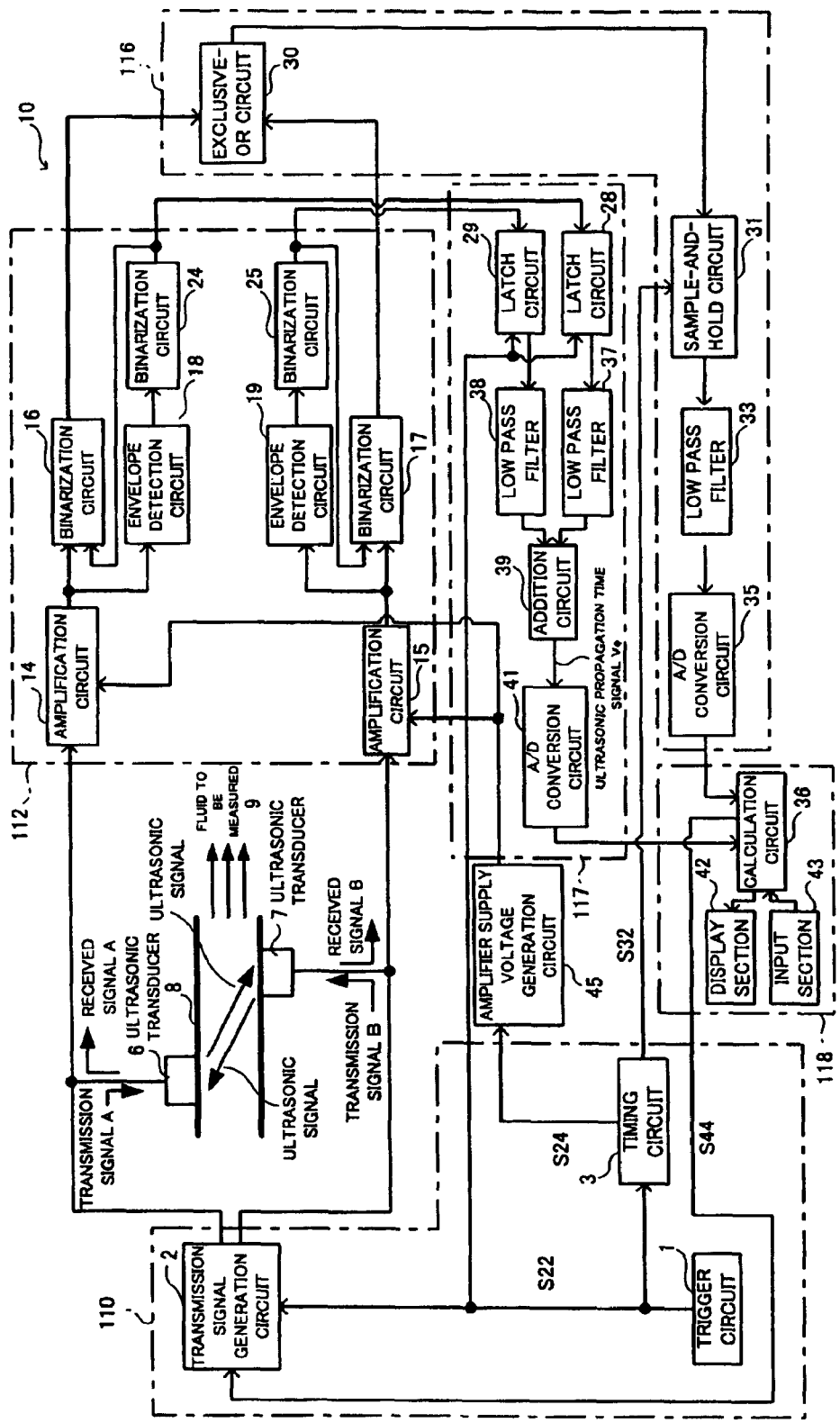
FIG. 21 is a diagram equivalent to FIG. 2 showing another embodiment of the ultrasonic flow velocity meter of the present invention.

FIG. 21 is another configuration example which substitutes FIG. 2 and is mainly intended to further reduce power consumption and operate the amplification circuits 14 and 15 only with the timing of reception of the ultrasonic wave. The amplification circuits 14 and 15 are designed to perform an amplification operation only when they receive supply voltages and an amplifier supply voltage generation circuit 45 which generates supply voltages for the amplification circuits 14 and 15 is provided.

The amplifier supply voltage generation circuit 45 generates a supply voltage by receiving an amplification circuit power supply trigger signal S24 from the timing circuit 3 and can be constructed of a voltage booster circuit which boosts the voltage from a power supply (not shown) and a transformer circuit. Or when the voltage level of the amplification circuit power supply trigger signal S24 itself is sufficiently large, it is also possible to omit the amplifier supply voltage generation circuit 45 itself by using this amplification circuit power supply trigger signal S24 as the supply voltage.

The amplification circuit power supply trigger signal S24 is created by the timing circuit 3 based on the transmission trigger signal S22 and is created mostly at a timing corresponding to the received signal. When there is a delay time after the input of the amplification circuit power supply trigger signal S24 until the supply voltage is output from the amplifier supply voltage generation circuit 45, the timing circuit 3 can generate the amplification circuit power supply trigger signal S24 at the timing with the delay time taken into consideration.

Thus, the amplification circuits 14 and 15 consume power only for a period during which a supply voltage is generated and therefore compared to a case where the power is supplied all the time, it is possible to considerably reduce power consumption. Furthermore, since power consumption is small, it is possible to suppress a temperature rise and considerably improve the reliability of the amplification circuit compared to the case where power is applied all the time. In this way, influences of temperature drifts of the circuit can also be reduced.

Furthermore, when there is a strong interference wave between the transmission signal and reception signal, if the amplification circuits 14 and 15 are operating all the time, the subsequent binarization circuits 16 and 17 and envelope detection circuits 19 and 20 may operate, consume power and cause erroneous measurements. Thus, the amplification circuits 14 and 15 are operated only at timings at which reception signals are generated, allowing influences of such an interference wave to be removed.

8. Calculation of Flow Velocity and Flow Rate

The flow velocity $F_1$ of the fluid 9 that flows through the tube 8 can be generally calculated as:

$$F_1 = K \frac{t_1 - t_2}{(t_1 + t_2 - \tau)^2} \quad (20)$$

where $t_1$ is a propagation time of an ultrasonic wave in the direction along the flow, $t_2$ is a propagation time of an ultrasonic wave in the direction opposite to the flow and $\tau$ is a propagation time of a signal other than that of the fluid. Here, $\kappa$ is a constant. According to the method explained so far, it is possible to perform measurements with a high degree of accuracy assuming that $t_1-t_2$ is set to be $t_d$ and $(t_1+t_2)/2$ is set to be $t_0$ and $\kappa$ and $\tau$ can be known from the measuring condition, etc., and therefore it is possible to calculate the flow velocity $F_1$ of the fluid 9 that flows through the tube 8 accurately as a consequence.

Furthermore, if the flow velocity $F_1$ is determined, it is possible to accurately calculate the flow rate of the fluid 9 which flows through the tube 8 using this flow velocity $F_1$.

By storing the predetermined values $\kappa$ and $\tau$ in the calculation circuit 36, it is possible to calculate the flow velocity $F_1$. Furthermore, if the flow velocity $F_1$ is determined, it is possible to accurately calculate the flow rate of the fluid 9 which flows through the tube 8 using this flow velocity $F_1$.

Figure 22:
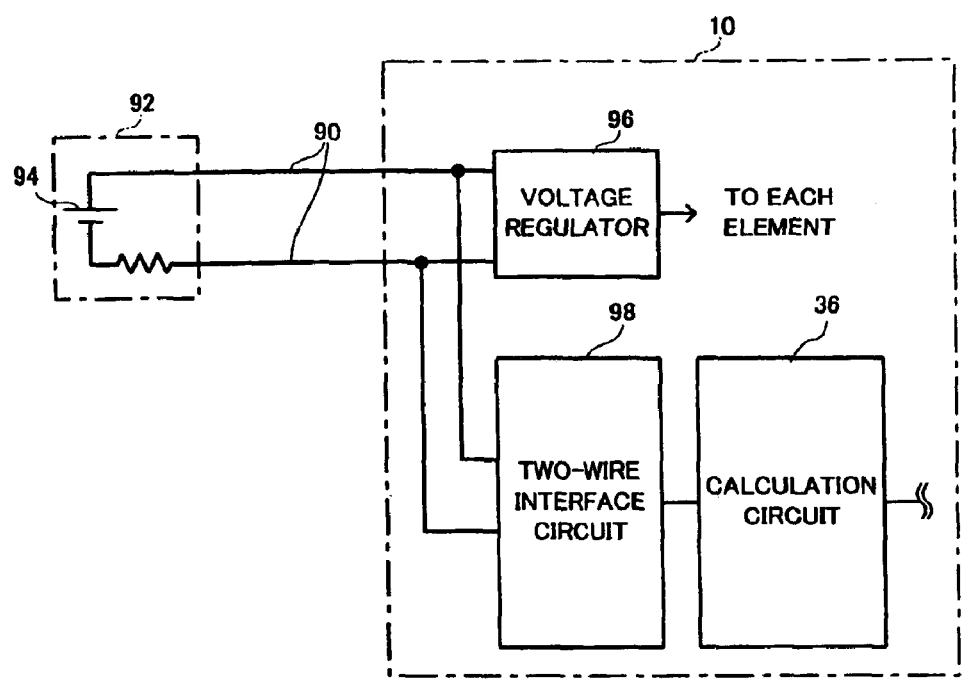
FIG. 22 is a block diagram showing an embodiment with the ultrasonic flow velocity meter of the present invention connected to a two-wire loop.

The calculated flow velocity $F_1$ or flow velocity $F_1$ and flow rate can be shown on the display section 42. Furthermore, this current meter can also be connected to a two-wire control loop. FIG. 22 shows an example where the ultrasonic flow velocity meter 10 of the present invention is connected to the two-wire loop. The ultrasonic flow velocity meter 10 is connected to a remote control section 92 by this two-wire loop 90. The control section 92 is provided with a power supply 94 which supplies power so that the ultrasonic flow velocity meter 10 operates and a current of 4 to 20 mA flows through the two-wire loop 90. The ultrasonic flow velocity meter 10 includes a voltage regulator 96 which regulates a voltage supplied from the two-wire loop 90 and the voltage regulated by this voltage regulator 96 is supplied to components that make up the ultrasonic flow velocity meter 10.

Furthermore, the supply voltage is supplied to the ultrasonic flow velocity meter 10 through the two-wire loop 90 and measurement results of the flow velocity, flow velocity and flow rate or flow rate calculated at the calculation circuit 36 of the ultrasonic flow velocity meter 10 are sent to the control section 92. For this object, the ultrasonic flow velocity meter 10 includes a two-wire interface circuit 98 which connects the two-wire loop 90 with the calculation circuit 36. The two-wire interface circuit 98 can be constructed of, for example, a D/A converter and analog output circuit which can convert a digital signal indicating the flow velocity, flow velocity and flow rate or flow rate output from the calculation circuit 36 to an analog signal and supply it as a current of 4 to 20 mA to the two-wire loop 90.

Thus, between the control section 92 and the remote ultrasonic flow velocity meter 10, it is possible to supply the supply voltage and send the measurement result only through the two-wire loop. The ultrasonic flow velocity meter of the present invention is designed to reduce power consumption as described above, and can therefore be suitably operated even at a low supply voltage from the two-wire loop.

Furthermore, the ultrasonic flow velocity meter 10 of the present invention can also be operated with a supply voltage through a solar battery without using any two-wire loop, etc.

Industrial Applicability

As described above, compared to a conventional propagation time difference system, the present invention can calculate the flow velocity from a phase difference using a low voltage burst signal, eliminates the need for a power supply circuit to generate a high voltage, also eliminates the need for a counter circuit that must operate at high speed and can therefore be implemented with a small apparatus with small power consumption and also improve an explosion proof characteristic. Furthermore, the use of a burst signal allows a pair of transmission/reception ultrasonic transducers to carry out both transmission and reception operations making it possible to construct a small apparatus at low cost. Furthermore, the use of a burst signal makes it possible to perform transmission, reception and processing such as phase difference measurement and flow velocity measurement after the reception intermittently and thereby reduce power consumption unlike the conventional one that processes continuous waves all the time.

What is claimed is:

1. A low power ultrasonic flow velocity meter comprising:
   burst signal generating means for generating two kinds of burst signals with a phase difference;
   a pair of transmission/reception ultrasonic transducers located on the upstream side and downstream side of a conduit to be measured, which receive their corresponding burst signals from said burst signal generating means, convert said burst signals, send ultrasonic waves with a phase difference into the conduit to be measured, receive ultrasonic waves sent by the other transmission/reception ultrasonic transducer and propagated through the conduit to be measured and convert the ultrasonic waves to received signals;
   binarizing means for binarizing the received signals from said respective transmission/reception ultrasonic transducers;
   phase difference measuring means for measuring a phase difference between these binarized received signals binarized by the binarizing means by a logical circuit; and
   flow velocity measuring means for measuring a flow velocity of the conduit to be measured based on the phase difference signal between the received signals from said phase difference measuring means.

2. The low power ultrasonic flow velocity meter according to claim 1, wherein said phase difference measuring means provides a phase difference signal indicating a phase difference between two received signals to pass through a low pass filter and measures the DC level thereof.

3. The low power ultrasonic flow velocity meter according to claim 1, wherein said phase difference measuring means measures phase differences between only the maximum amplitude portions of center of waveforms of said respective received signals.

4. The low power ultrasonic flow velocity meter according to claim 3, wherein said phase difference measuring means includes a sample-and-hold circuit to output a phase difference only for a determined period.

5. The low power ultrasonic flow velocity meter according to claim 1, further comprising frequency dividing means for dividing frequencies of the received signals binarized by said binarizing means between said binarizing means and said phase difference measuring means, wherein said phase difference measuring means measures the phase difference between these received signals whose frequencies have been divided by said frequency dividing means.

6. The low power ultrasonic flow velocity meter according to claim 1, further comprising ultrasonic propagation time measuring means for measuring an ultrasonic propagation time after generation of a burst signal by said burst signal generating means until reception by said transmission/reception ultrasonic transducers, wherein said flow velocity measuring means measures the flow velocity of the conduit to be measured based on said ultrasonic propagation time as well as the phase difference signal between the received signals from said phase difference measuring means.

7. The low power ultrasonic flow velocity meter according to claim 5, wherein said ultrasonic propagation time measuring means provides an ultrasonic propagation time signal indicating the ultrasonic propagation time to pass through a low pass filter to measure the DC level thereof.

8. The low power ultrasonic flow velocity meter according to claim 1, wherein said phase difference measuring means measures a phase difference between two kinds of burst signals having the phase difference from said burst signal generating means during a corrective measurement, and wherein said flow velocity measuring means corrects the flow velocity measurement using said measured phase difference between the burst signals.

9. The low power ultrasonic flow velocity meter according to claim 1, further comprising a switching circuit that switches between two kinds of burst signals with a phase difference from said burst signal generating means during a corrective measurement and during a normal measurement to supply the corresponding burst signal of the two kinds of the burst signals to said transmission/reception ultrasonic transducers.

10. The low power ultrasonic flow velocity meter according to claim 1, further comprising an amplification circuit that amplifies a received signal between said pair of transmission/reception ultrasonic transducers and said flow velocity measuring means, wherein said amplification circuit performs an amplification operation only at predetermined timing including reception timing of the received signal.

11. The low power ultrasonic flow velocity meter according to claim 1, wherein the ultrasonic flow velocity meter is connected to the power supply by a two-wire loop and further comprises a two-wire interface section for transmitting the measured values obtained through the flow velocity measuring means using the two-wire loop.

12. A low power ultrasonic flow velocity meter comprising:

a burst signal generator for generating two kinds of burst signals with a phase difference;

a pair of transmission/reception ultrasonic transducers located on the upstream side and downstream side of a conduit to be measured, which receive their corresponding burst signals from said burst signal generator, convert said burst signals, send ultrasonic waves with a phase difference into the conduit to be measured, receive ultrasonic waves sent by the other transmission/reception ultrasonic transducer and propagated through the conduit to be measured and convert the ultrasonic waves to received signals;

a binarizor for binarizing the received signals from said respective transmission/reception ultrasonic transducers;

a phase difference detector for measuring a phase difference between these binarized received signals from their respective received signals binarized by the binarizor by a logical circuit; and a flow velocity calculator for measuring a flow velocity of the conduit to be measured based on the phase difference signal between the received signals from said phase difference detector.

13. The low power ultrasonic flow velocity meter according to claim 12, wherein said phase difference detector provides a phase difference signal indicating a phase difference between two received signals to pass through a low pass filter and measures the DC level thereof.

14. The low power ultrasonic flow velocity meter according to claim 12, wherein said phase difference detector measures phase differences between only the maximum amplitude portions of center of waveforms of said respective received signals.

15. The low power ultrasonic flow velocity meter according to claim 14, wherein said phase difference detector includes a sample-and-hold circuit to output a phase difference only for a determined period.

16. The low power ultrasonic flow velocity meter according to claim 12, further comprising a frequency divider for dividing frequencies of the received signals binarized by said binarizor between said binarizor and said phase difference detector, wherein said phase difference detector measures the phase difference between these received signals whose frequencies have been divided by said frequency divider.

17. The low power ultrasonic flow velocity meter according to claim 12, further comprising an ultrasonic propagation time measurement circuit for measuring an ultrasonic propagation time after generation of a burst signal by said burst signal generator until reception by said transmission/reception ultrasonic transducers, wherein said flow velocity calculator measures the flow velocity of the conduit to be measured based on said ultrasonic propagation time as well as the phase difference signal between the received signals from said phase difference detector.

18. The low power ultrasonic flow velocity meter according to claim 17, wherein said ultrasonic propagation time measurement circuit provides an ultrasonic propagation time signal indicating the ultrasonic propagation time to pass through a low pass filter to measure the DC level thereof.

19. The low power ultrasonic flow velocity meter according to claim 12, wherein said phase difference detector measures a phase difference between two kinds of burst signals having the phase difference from said burst signal generator during a corrective measurement, and wherein said flow velocity calculator corrects the flow velocity measurement using said measured phase difference between the burst signals.

20. The low power ultrasonic flow velocity meter according to claim 12, further comprising a switching circuit that switches between two kinds of burst signals with a phase difference from said burst signal generator during a corrective measurement and during a normal measurement to supply the corresponding burst signal of the two kinds of the burst signals to said transmission/reception ultrasonic transducers.

21. The low power ultrasonic flow velocity meter according to claim 12, further comprising an amplification circuit that amplifies a received signal between said pair of transmission/reception ultrasonic transducers and said flow velocity calculator, wherein said amplification circuit performs an amplification operation only at predetermined timing including reception timing of the received signal.

22. The low power ultrasonic flow velocity meter according to claim 12, wherein the ultrasonic flow velocity meter is connected to the power supply by a two-wire loop and further comprises a two-wire interface section for transmitting the measured values obtained through the flow velocity calculator using the two-wire loop.

* * * * *